United States Patent
Boht et al.

(10) Patent No.: US 12,081,607 B2
(45) Date of Patent: Sep. 3, 2024

(54) SHARED CAPTURE SESSION

(71) Applicant: Dropbox, Inc., San Francisco, CA (US)

(72) Inventors: Michael Adam Boht, Waterloo (CA); Kevin Li, New York City, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/146,233

(22) Filed: Dec. 23, 2022

(65) Prior Publication Data
US 2024/0214439 A1    Jun. 27, 2024

(51) Int. Cl.
| G06F 15/16 | (2006.01) |
| G06F 3/16 | (2006.01) |
| H04L 51/046 | (2022.01) |
| H04L 51/063 | (2022.01) |
| H04L 65/613 | (2022.01) |

(52) U.S. Cl.
CPC ............ H04L 65/613 (2022.05); G06F 3/165 (2013.01); H04L 51/046 (2013.01); H04L 51/063 (2013.01)

(58) Field of Classification Search
CPC ... H04L 65/401; H04L 65/403; H04L 65/613; H04L 51/046; H04L 51/063; G06F 3/165
See application file for complete search history.

(56) References Cited

U.S. PATENT DOCUMENTS

| 8,347,216 B2 | 1/2013 | Shin et al. |
| 9,141,332 B2 | 9/2015 | Coleman et al. |
| 10,432,728 B2 | 10/2019 | Dachille et al. |
| 10,841,497 B2 | 11/2020 | Bockhold et al. |
| 10,887,551 B2 | 1/2021 | Yoshida |
| 11,310,294 B2 | 4/2022 | Faulkner et al. |
| 11,330,026 B1 | 5/2022 | Han et al. |
| 11,409,414 B2 | 8/2022 | Shaw et al. |
| 2007/0282793 A1 | 12/2007 | Majors et al. |
| 2012/0133727 A1 | 5/2012 | Bolduc et al. |
| 2014/0194152 A1* | 7/2014 | Liu ..................... H04M 3/5315 455/466 |
| 2016/0301723 A1* | 10/2016 | Sinclair ................ H04L 65/765 |
| 2019/0281327 A1 | 9/2019 | Li et al. |
| 2023/0017859 A1* | 1/2023 | Li ......................... H04L 65/403 |
| 2023/0142234 A1* | 5/2023 | Boyce .................. H04N 21/278 709/217 |

OTHER PUBLICATIONS

Scrivener S.A.R., et al., "The LookingGlass Distributed Shared Workspace," Computer Supported Cooperative Work (CSCW), vol. 2, Issue 3, 1994, pp. 137-157.

* cited by examiner

Primary Examiner — Joseph R Maniwang
(74) Attorney, Agent, or Firm — Polsinelli PC

(57) ABSTRACT

The present technology pertains to initiating and then sharing a capture session. According to at least one example, the present technology includes receiving, from a first device, a request to initiate a shared capture session. In response, the first device launches a capture session that receives audio, video, and screen data from the first device. The first device can then share the capture session with another user, via a link. After a second user selects the link at a second device, audio and video data from the second device are added to the capture session. The capture session aggregates and captures the audio, video, and screen data from both devices. After the capture session ends, a captured media object from the capture session can be stored at the first device, and sent to the second device, and the content management system.

18 Claims, 13 Drawing Sheets

SHARED CAPTURE SESSION

TECHNICAL FIELD

The present technology pertains to configuring and initiating a capture session at a user device and sharing the capture session with another user.

BACKGROUND

Computing devices provide various ways for users to interact with digital content. Additionally, users have many different software tools to perform a variety of communication functions. For example, in a single day, users may communicate via e-mail, instant messaging, chat, or text (SMS) messaging just to communicate with other users or project teammates. Furthermore, many different applications are used to view, create, and edit various content items. Using multiple different forms of communication and applications to provide information and comments to other users creates unnecessary complexities and inefficiencies.

DETAILED DESCRIPTION

Figure 1:
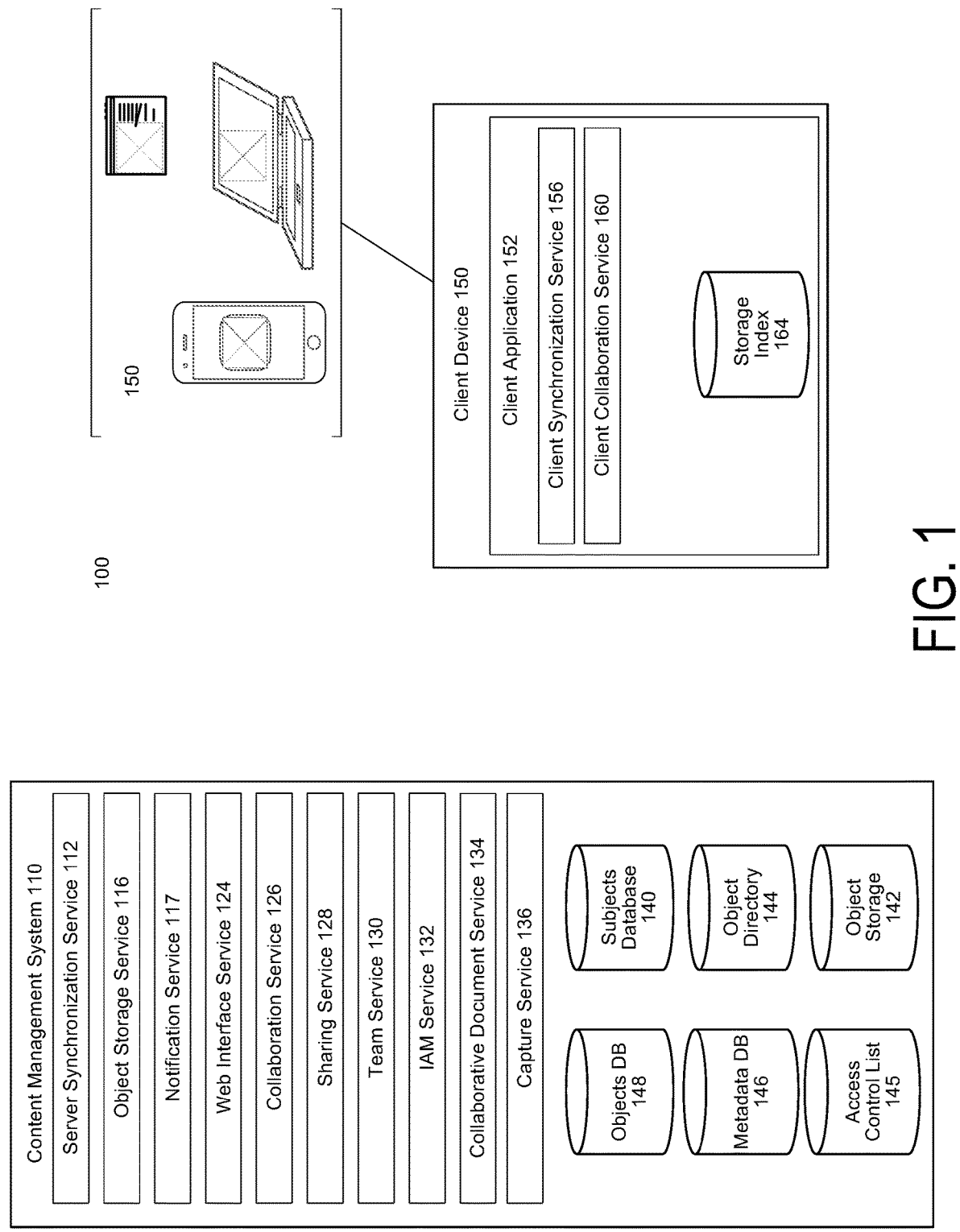
FIG. 1 illustrates an example of a content management system and client devices in accordance with some aspects of the present technology.

As video and presentation-based meetings become more popular, there is a growing demand for more efficient ways to capture and share meetings. While there are video and presentation services that try to make it possible to share meetings or capture presentations for later use, many users are finding these services unsatisfactory for their current needs. As users' expectations for video and presentation-based communications increase, providing an efficient and easy-to-use service that can quickly capture meetings, screens, or presentations, promote collaboration, and share information in near real-time is desired.

The present technology addresses a need in the art to provide a sharable and multi-user capture session that is easy to join, collaborate within, and share. Shared presentations and communications are difficult to implement with multiple users and typically require installed software on multiple devices, extensive reliance on server processing, inability to share while viewing a shared presentation, inability to collaborate with the shared presentation, and the process to share the final product is cumbersome and slow. The present technology solves these as well as additional problems in the art.

The present technology pertains to a capture service that provides capture sessions that capture audio, video, screen, and peripheral data. The capture sessions can be quickly and easily shared with multiple additional users through a link provided by a capture service. By sharing the capture session, multiple users can include the audio, video, screen, and peripheral data to the capture session as the capture session is taking place. To start the capture session, the user can access the capture service through a browser-based application or through a software application on a user device. Either application allows a user to start a capture session, which will capture the audio, video, screen, and peripheral data from the user device where the capture session started. Using, for example, the browser-based application, the user can request to share the capture session with additional users. Based on the request, the capture service will generate a link to the capture session and provide that link to the user device, where the user can then share the link with other users. When an additional user receives the link, the second user can select the link, launching a browser-based application to join the capture session on the second user's device. The shared capture session can simultaneously capture the audio, video, screen, and peripheral data from both the first and second devices. This easy-to-use mechanism allows for quick and easy sharing of capture sessions without the need to confirm what applications or devices are available to the other users.

Either during the capture session or after the capture session is completed, the user device can automatically send a captured media object to users who participated in the shared capture session. Furthermore, the capture service is also able to store the captured media object after concluding the capture session, the storage taking place using a content management system. Because the captured media object is available in near real-time, the final captured media object can be shared as the capture session concludes.

Capture sessions can be configured to receive the audio, video, screen, and peripheral data taking place on a user device. There is a need in the art to operate a capture session on a client device and then invite another user on a second device to take part in the capture session, where the capture session is configured to collect at least the audio, video, screen, and peripheral data from the second device and send it to the first device. The capture session can also be easily configured to only collect a subset of the data available at the user devices. A shared capture session allows the second device to transmit the audio and video data from the second device to the first device, where the first device, as the host or primary device in the shared capture session, can receive the data transmitted from the second device. The first device can then aggregate the received data from the second device along with the audio, video, screen, and peripheral data collected at the first device to create a single stream of aggregated data. The first device can then capture and store the single stream of aggregated data and also provide the single stream of aggregated data to the second device. The present technology improves the efficiency of users sharing, capturing, and collaborating in a shared capture session by generating and sharing a link to additional devices that can operate a browser-based capture session.

One way to implement the shared capture session is via a browser-based capture application that uses the browser application already on the user devices. Using a browser-based capture application to join the capture session is beneficial because when using a browser already on the user devices, the devices do not need to download any software programs, users are already comfortable and familiar with the browser environment, and users can easily and quickly access the shared capture session through a link that launches the browser. Once the capture session is running, the capture session can collect and transmit at least the audio and video data from the second device because the browsers are already configured to receive this information from the second user device. Finally, by using a browser on the second device to run the browser-based capture application, the browser is already configured to communicate with the capture service or other servers to transmit the collected audio and video data to the first device during the shared capture session. The advantages to using a browser-based capture application on the device joining the shared capture session are that the user does not need to know how to set up a capture session, download any new or different programs, or have any advance knowledge of the capture session, but can still take part in a robust, collaborative shared capture session.

The present technology also utilizes the initial device that starts the shared capture session to aggregate and processes the data. Utilizing the initial device to do the processing has many advantages over a server-based system. The initial device can aggregate the audio, video, screen, and peripheral data from the initial device with any audio, video, screen, and peripheral data received from devices that join the shared capture session. By using the initial device to process the data into a single stream and then provide that single stream back to the shared capture session, every member of the shared capture session can experience the capture session in the same way through the same interface presentation. Using the initial device also allows for more control over how the shared capture session is presented to the participants in the shared capture session. The user at the initial device can manipulate what data is received, how it is presented, and where it is stored by interacting with the shared capture session at the initial device. When using a server-based system, each user can control how their data is provided and presented, which can cause issues with security, as the host user has no control over what data is put into the stream, and the view seen by all users within the server-based system can be unique to the end users. These shortcomings are overcome by the present technology, and these advantages are available because the initial device receives all the data from the devices that joined the shared capture session and is then processing and aggregating that data at the device.

The present technology also pertains to a capture service that is accessed by a user, who can configure a request for a capture session. The capture session, once started, can be shared with multiple client devices. The user can configure the request for the capture session, or the capture session can be set up so those chosen configuration settings are stored for the user and any recipients of the capture session so that when a user joins a capture setting, it is automatically set up to use. Further, the user can easily request to share the capture session with another user by using an interface button provided by the browser-based application, which requests a share link to the capture session. Because the capture session is operated through the browser, the capture session can be easily shared with another user. The second user can join the capture session by just accessing the received link, which will launch a browser and join the capture session, which can include the pre-configured settings for the capture session, allowing the capture session to launch and collect data without further user interaction. The second user does not require any software programs or special hardware to join the capture session and share audio and video information. This improvement makes sharing, joining, and collaborating, in a capture session more efficient.

The present technology also provides the ability to easily share the captured media object from the capture session. Currently, there is a need in the art to easily provide the captured media object to the first device as well as other users, as the current process is cumbersome and requires processing after completion of a presentation. The current technology uses the browser-based application on the first device to aggregate and process the data collected from the first device as well as the data received from other devices that join the capture session. The browser-based application at the first device can then create the captured media object while the shared capture session is collecting and receiving data. The browser-based application at the first device can segment, store, and transmit the data as it is captured at the capture session. By segmenting, storing, and transmitting the data as it is captured from the shared capture session, the data can be provided to a content management system, the first device, and any other devices that join the shared capture session during the shared capture session. The data captured from the shared capture session can then be made available almost immediately upon the completion of the shared capture session. Making the captured media object available as soon as the capture session concludes also facilitates asynchronous collaboration. For example, a small group of users could create a quick shared capture session commenting on a larger group presentation, and then the small group could present the captured media object to the larger group as a quick way to provide comments on the presentation. Further, because the initial user at the first device will typically be signed into a user account associated with a content management system, the captured content item can be provided to a location in the user account for storage. This improved process provides for easier and faster sharing without the need for user interaction to facilitate sharing or storage.

Accordingly, the present technology provides benefits, including making it more efficient to initiate a capture session by a user, making it easier to collaborate during the capture session, and making it easier and more efficient for users to share the capture session. These, and other advantages, will become more apparent throughout the following description.

In some embodiments, the disclosed technology is deployed in the context of a content management system having object synchronization capabilities and collaboration features, among others. An example configuration of system 100 is shown in FIG. 1, which depicts content management system 110 interacting with client device 150.

Accounts

Content management system 110 can store objects in association with accounts, as well as perform a variety of object management tasks, such as retrieving, modifying, browsing, and/or sharing the object(s). Furthermore, the content management system 110 can enable an account to access object(s) from multiple client devices.

Content management system 110 supports a plurality of accounts. A subject (user, group, team, company, etc.) can create an account with the content management system 110, and account details can be stored in subjects database 140. Subjects database 140 can identify a registered subject by a subject ID and store profile information for registered subjects in association with the subject ID. In some cases, profile information for registered subjects includes a subject name and/or email address. Subjects database 140 can include account management information, such as account type (e.g., various tiers of free or paid accounts), storage space allocated, storage space used, client device 150 having a registered content management system client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subjects database 140 need not store complete information associated with an account for a subject. Some portion of information associated with an account for a subject can also be stored in another database of content management system 110, such as metadata database 146, or in a database external to the content management system 110.

Subjects database 140 can store groups of accounts associated with a subject. Groups can have permissions based on group permissions statements and/or access control lists, and members of the groups can inherit the permissions. For example, a marketing group can have access to one set of objects, while an engineering group can have access to another set of objects. An administrator group can modify groups, modify subject accounts, etc. Groups are also subjects identified by subject ID.

In some embodiments, subjects database 140 can be broken into a plurality of tables, indexes, and other data structures.

Object Storage

A feature of content management system 110 is the storage of objects, which can be stored in object storage 142. An object generally is any entity that can be recorded in a file system. Objects can be any object, including digital data such as documents, collaboration objects, text files, audio files, image files, video files, webpages, executable files, binary files, object directories, folders, zip files, playlists, albums, symlinks, cloud docs, mounts, placeholder objects referencing other objects in the content management system 110 or in other content management systems, etc.

In some embodiments, objects can be grouped into a collection, which can refer to a folder including a plurality of objects or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc., can be stored in the objects database 148. Objects database 148 can also include a subject account identifier that identifies the subject IDs that have access to the object.

In some embodiments, objects database 148 can be broken into a plurality of tables, indexes, and other data structures.

Each of the various storages/databases, such as object storage 142, object directory 144, objects database 148, and metadata database 146, can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, the content management system 110 may include more or fewer storages and/or databases than shown in FIG. 1.

In some embodiments, object storage 142 is associated with at least one object storage service 116, which includes software or other processor-executable instructions for managing the storage of objects, including but not limited to receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object but will output a different hash for a different object. Using this methodology, object storage service 116 can output a unique hash for each different version of an object.

Object storage service 116 can also designate or record a parent of an object or a content path for an object in the objects database 148. The content path can include the name of the object and/or folder hierarchy associated with the object. For example, the content path can include a folder or path of folders in which the object is stored in a local file system on a client device. In some embodiments, the objects database 148 might only store a direct ancestor or direct child of any object, which allows a full path for an object to be derived, and can be more efficient than storing the whole path for an object.

While objects are stored in object storage 142 in blocks and may not be stored under a tree-like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects viewing objects but does not correlate to storage locations of objects in object storage 142.

While the directory structure in which an account views objects does not correlate to the storage locations of the objects at content management system 110, the directory structure can correlate to the storage locations of the objects on the client device 150, depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file paths, and/or the relationship of objects to various accounts, collections, or groups in metadata database 146, in association with the object ID of the object.

Object storage service 116 can also store a log of data regarding changes, access, etc., in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations by using an object version control mechanism that tracks changes to objects, different versions of objects (including diverging version trees), and a change history that can be acquired from objects database 148.

Object Synchronization

Another feature of content management system 110 is the synchronization of objects with at least one client device 150. Client device(s) 150 can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application-specific space or in the cloud. Client device 150 can be any client device accessing content management system 110 via a web browser and accessing objects via a web interface. While example client device 150 is depicted in form factors such as a laptop, mobile device, or web browser, it should be understood that the descriptions thereof are not limited to devices of these example form factors. For example, a mobile device might have a local file system accessible by multiple applications resident thereon or might access content management system 110 via a web browser. As such, the form factor should not be considered limiting when considering client 150's capabilities. One or more functions described herein with respect to the client device 150 may or may not be available on every client device depending on the specific capabilities of the device—the file access model being one such capability.

In many embodiments, client devices 150 are associated with an account of content management system 110, but in some embodiments, client devices 150 can access content using shared links and do not require an account.

As noted above, some client devices can access content management system 110 using a web browser. However, client devices can also access content management system 110 using client application 152 stored and running on the client device 150. Client application 152 can include a client synchronization service 156.

Client synchronization service 156 can be in communication with server synchronization service 112 to synchronize changes to objects between the client device 150 and the content management system 110.

Client device 150 can synchronize content with the content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110 and vice versa. In embodiments wherein synchronization is from client device 150 to content management system 110, a subject can manipulate objects directly from the file system of client device 150, while client synchronization service 156 can monitor the directory on the client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116, including functions addressed above, such as dividing the object into blocks, hashing the object to generate a unique identifier, etc. Client synchronization service 156 can index content within storage index 164 and save the result in storage index 164. Indexing can include storing paths plus the object identifier and a unique identifier for each object. In some embodiments, client synchronization service 156 learns the object identifier from server synchronization service 112 and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with the content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update the objects database 148, metadata database 146, object directory 144, object storage 142, subjects database 140, etc., as appropriate.

When synchronizing from content management system 110 to client device 150, data regarding a mount, modification, addition, deletion, or move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks, including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, and metadata, as its respective complete object on content management system 110 but lacks the data of the complete object. The placeholder object can be a few bytes or less in size, while the respective complete object might be significantly larger. After client device 150 attempts to access the object, client synchronization service 156 can retrieve the data of the object from content management system 110 and provide the complete object to the client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150, all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real-time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments, a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform-agnostic manner. That is, the content can be shared across multiple client devices 150 of varying types, capabilities, operating systems, etc. The content can also be shared across varying types of subject accounts.

To share an object within content management system 110 sharing service 128 can add and associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145, which includes a description of complete access rights pertaining to a respective object. An access control list for any respective object in content management system 110 can be derived from objects database 148. In some embodiments, it is not desirable to maintain a persistent access control list 145 for a respective object, as an access control list 145 for a respective object can be derived when needed. In some embodiments, objects can inherit access rights from another object, such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and, optionally, a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from a specified domain, i.e., from within a corporate network domain or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject, and the contributing subject can upload an object to the first subject's subject account using the URL.

Team Service

In some embodiments, content management system 110 includes team service 130. Team service 130 can provide functionality for creating and managing defined teams of subject accounts. Teams can be created for a company, with sub-teams (e.g., business units, project teams, etc.), and subject accounts assigned to teams and sub-teams, or teams can be created for any defined group of subject accounts. Team service 130 can provide a common shared space for the team, private subject account folders, and access to limited shared folders. Team service 130 can also provide a management interface for an administrator to manage collections and objects within the team and can manage subject accounts that are associated with the team. Teams, sub-teams, and subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g., a subject account with subject rights and administrator rights), IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system 110 can provide information about how subjects with which an object is shared are interacting or have interacted with the object. In some embodiments, content management system 110 can report that a subject with which an object is shared is currently viewing the object. For example, client collaboration service 160 can notify notification service 117 when client device 150 is accessing the object. Notification service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment, and collaboration service 126 can send a notification to that subject, letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments, content management system 110 can also include collaborative document service 134, which can provide an interactive object collaboration platform whereby subjects can simultaneously create collaboration objects, comment in the collaboration objects, and manage tasks within the collaboration objects. Collaboration objects can be files that subjects can create and edit using a collaboration object editor and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments, this can be managed by requiring two subjects to access an object through a web interface, and there they can work on the same copy of the object at the same time.

Collaboration Companion Interface

In some embodiments, the client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by client application 152, the native application may not provide any native way to display the above-addressed collaboration data. In such embodiments, client collaboration service 160 can detect that a subject has opened an object and can provide an overlay with additional information for the object, such as collaboration data. For example, the additional information can include comments for the object, status of the object, activity of other subjects previously, or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package, such as an application running on client device 150, can programmatically make API calls directly to content management system 110 when a subject provides authentication credentials to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with its own client software, can be associated with a single account, and objects in the account can be synchronized between each of the multiple client devices.

Client device 150 can connect to content management system 110 on behalf of a subject. A subject can directly interact with client device 150, for example, when client device 150 is a desktop or laptop computer, phone, television, internet-of-things device, etc. Alternatively or additionally, client device 150 can act on behalf of the subject without the subject having physical access to client device 150, for example, when client device 150 is a server.

Some features of client device 150 are enabled by an application installed on client device 150. In some embodiments, the application can include a content management system-specific component. For example, the content management system specific component can be a standalone client application 152, one or more application plug-ins, and/or a browser extension. However, the subject can also interact with content management system 110 via a third-party application, such as a web browser, that resides on client device 150 and is configured to communicate with content management system 110. In various implementations, the client application 152 can present a subject interface (UI) for a subject to interact with the content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as a folder in a file system, and all objects within that folder can be synchronized with content management system 110. In some embodiments, client application 152 can include a selector to choose one of the multiple accounts to be the primary account or default account.

In some embodiments, content management system 110 can include capture service 136. Capture service 136 can be used to configure a capture session request where the capture session will be executed at a client device using a browser-based application or a capture application associated with the capture service 136. The captured or recorded data from the capture session is a captured media object can be stored by object storage service 116 at a location configured by capture service 136.

Third-Party Services

In some embodiments, content management system 110 can include functionality to interface with one or more third-party services such as workspace services, email services, task services, etc. In such embodiments, content management system 110 can be provided with login credentials for a subject account at the third-party service to interact with the third-party service to bring functionality or data from those third-party services into various subject interfaces provided by content management system 110.

While content management system 110 is presented with specific components, it should be understood by one skilled in the art that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art that the architectural configuration of system 100 is simply one possible configuration and that other configurations with more or fewer components are possible.

Figure 2A:
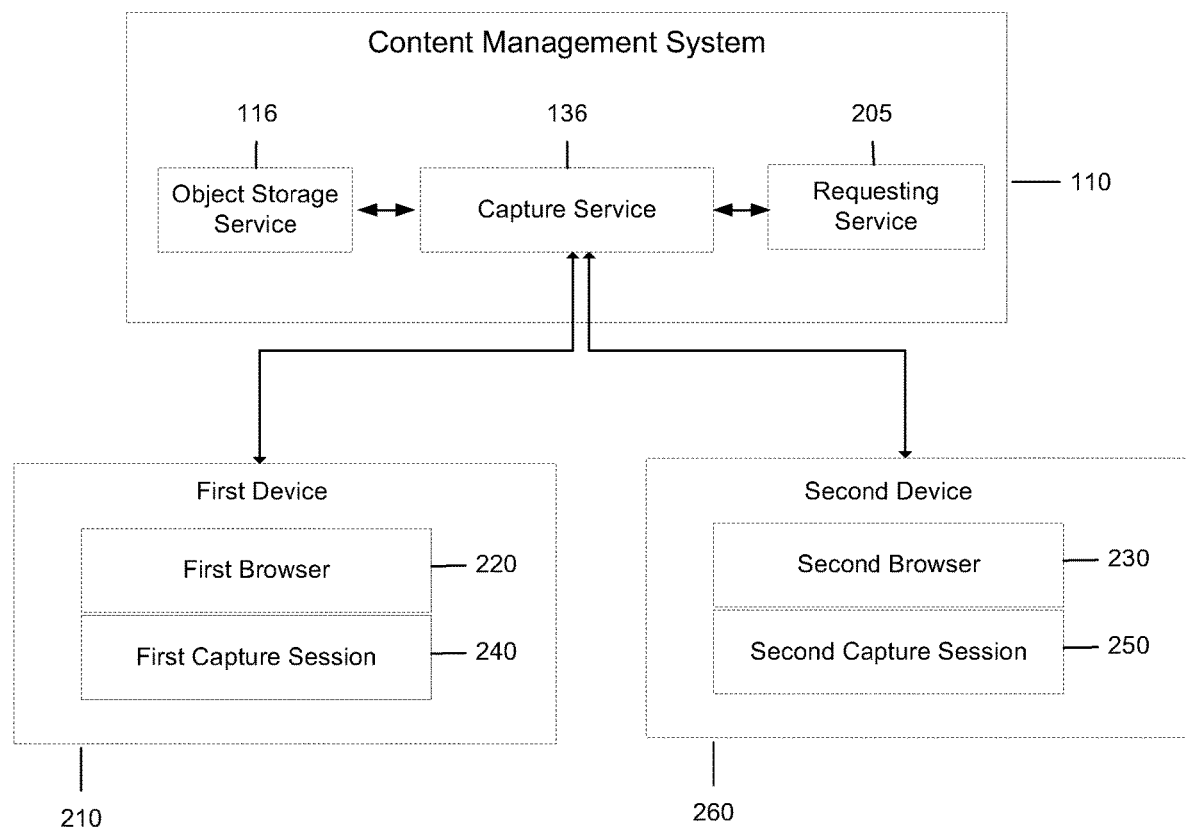
FIG. 2A illustrates an example system for creating and sharing a capture session and causing both client devices to carry out the capture session in accordance with some aspects of the present technology.

FIG. 2A illustrates an example system for creating a shared capture session at capture service 136 at content management system 110, initiating the capture session on the first device 210, and sharing the capture session with the second device 260.

FIG. 2A illustrates capture service 136. Capture service 136 facilitates initiating and sharing capture sessions, including configuring a capture session for the user at the first device 210. In some embodiments, capture service 136 can be a standalone service interfacing with the content management system 110 via one or more application programming interfaces (APIs), while in some embodiments, capture service 136 can be integrated with the content management system 110 as a service provided by the content management system 110.

Whether capture service 136 is a service provided by a content management system 110 or as a standalone service, capture service 136 can be integrated with requesting service 205. Capture service 136 can be integrated with requesting service 205 by way of a specifically built integration or by way of requesting service 205 interacting with capture service 136 using one or more APIs. Additionally, a user could navigate to a web page or application provided by the capture service to configure and request a first capture session 240.

Capture service 136 can be configured to provide an interface for configuring a capture session, e.g., first capture session 240. The first capture session 240 can be configured with the appropriate configurations set by a user. For example, each capture session started at the first device can be configured to operate using specific video settings, audio settings, screen capture settings, and peripheral device inputs, amongst other possible configurations. In one example, each configuration can be stored at the capture service 136 to create a default starting point for a capture session. However, each of these configurations is alterable and can be changed by the user before or during a capture session.

In some embodiments, the capture service 136 and the browser-based application or the capture application associated with the capture service 136 can interact with the capture service 136 through a purpose-built integration (e.g., an application) or one or more public APIs. In some embodiments, the capture application, the browser-based application on, e.g., first browser 220 and second browser 230 of FIG. 2B, or the requesting service 205 can present configurations to utilize capture service 136.

The capture service 136 can also launch an interface at the browser to configure the capture session request. The user can configure the capture session request by, for example, choosing the recipients beyond themselves of the capture session request but may also include the type of capture session, such as whether to receive a screenshot, camera video recording, camera photo, screen video recording, audio recordings, or GIF, or any combination of these configurations. The additional configurations can include a location to store the captured media object, whether the captured media object should include a screen capture and/or video capture, the length of the captured media object, etc. In some embodiments, additional configurations can include linking the capture session request to a workflow, whereby the workflow is triggered when the captured media object is received. The capture session request can be further configured to begin streaming the captured media object to the requesting user as the capture session begins.

Additional configurations at capture service 136 are possible and can be associated with the capture session request. One such configuration is to capture data during the capture session for the desired length of time. This configuration can be implemented in any of several ways. In one example, the interface provided by capture service 136 can include a timer that automatically ends the capture session when the capture session exceeds the time limit. Another way to implement this configuration is by using the object storage service 116 to automatically truncate any capture sessions that are longer than the configured time limit.

Security and privacy are also important in the context of the present technology. In addition to state-of-the-art best practices to prevent spoofing and other malicious and unauthorized practices over the Internet, the present technology can also be configured to ensure valid users of capture service 136 do not abuse the service. For example, object storage service 116 can configure access to the captured media object to be via browser only. By preventing other methods of access, the capture service can prevent the captured media object from being downloaded and saved to local storage on any client device without specific permissions granted. Object storage service 116 can also limit the number of times a captured media object can be accessed and can limit the amount of time the captured media object can be accessed. Additionally, the capture session request for the capture session can also be configured with a time-to-live (TTL) which will limit the time period in which a captured media object will remain accessible or stored, after which the captured media object can be automatically deleted.

Once the capture session is initiated, the capture service 136 can begin receiving the audio, video, screen, and peripheral data captured at the first device 210 according to the configurations of the first capture session 240. The first capture session 240 is running on first device 210, which can be, for example, client device 150 or any other suitable client device. After initiation of the first capture session 240, a user at first device 210 can request to share the first capture session 240. The capture service 136 and/or requesting service 205 can generate a link to the first capture session 240, and capture service 136 can provide the generated link to the first device 210. The generated link allows other users to join the first capture session 240. Other users can join the first capture session 240 after a user of the first device 210 provides the generated link to additional users and/or devices. For example, first device 210 can provide the generated link to the second device 260. When the generated link is accessed at second device 260, it launches a browser that accesses a shared capture session that can receive and transmit data including audio, video, screen, and peripheral data captured from both the first device 210 and the second device 260. Specifically, when the link to the first capture session is accessed at second device 260, it launches second browser 230, where the second capture session 250 is presented.

In some embodiments, first device 210 and/or second device 260 can be a client device 150. Further, both the first device 210 and second device 260 can be running client application 152 to facilitate accessing and sharing capture sessions and storing captured media objects associated with capture sessions. However, client application 152 is not required to perform the features of the present technology. For example, any user device can access a capture session through a browser-based application, thereby reducing the overhead needed for each new user or device to operate a capture session. When using the browser-based application, there is no need to install a separate application to operate or join a capture session. The browser-based application also allows for the quick and easy sharing of capture sessions, as the device can access the capture service through the browser.

The first capture session 240 can include, for example, a screenshot, camera video recording, camera photo, screen video recording, audio recordings, graphics interchange format (GIF), or any combination of the audio and video generated or received by the first client device 210. For example, the configurations for first capture session 240 can include receiving a screenshot of a specific window displayed on first device 210 or can include receiving a recording of the screen of first device 210. In a further example, instead of or in addition to receiving images or video of the screen, the first capture session 240 can use the first device 210's camera to receive a video or a still image. In addition to video, first capture session 240 can use a microphone to receive audio at first device 210. It is also possible for the first capture session 240 to receive user inputs reflecting peripheral devices connected to the first device 210, including keyboard, mouse, or other inputs received by the first device 210. For example, text highlights received at first device 210 can be received during the first capture session 240. The first capture session 240 can be configured to cause the first device 210 to utilize any computer hardware, software, or user interface device to receive audio, video, screen, or peripheral data, and then the first capture session 240 can capture the received data.

After the first capture session 240 is initiated on, for example, the first browser 220 of the first device 210, the user is able to share the first capture session with other users. For example, capture service 136 can provide an interface button in the interface of a browser-based application in first browser 220 that, when activated, indicates to the capture service 136 that the user intends to share the first capture session 240 with a different device or different user. When the interface button is activated, the capture service 136 generates a link for the first capture session 240 and provides that link to the first device 210. The user is then able to share the provided link with another user or another device, e.g., second device 260, so that a different user or device can be included in the first capture session 240.

Figure 2B:
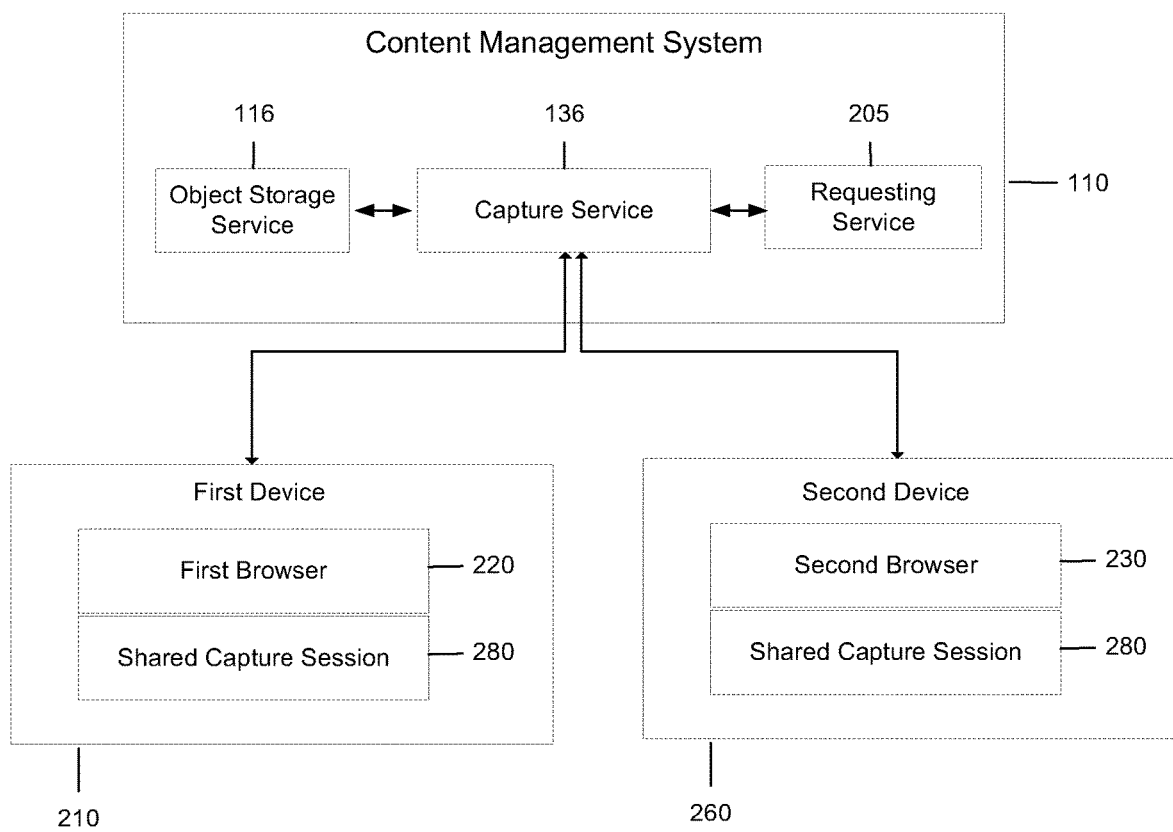
FIG. 2B illustrates an example system that provides a shared capture session to multiple user devices in accordance with some aspects of the present technology.

The first device 210 can share the link to the first capture session 240 with a second user or second device 260 of FIG. 2B. In this example, the first device 210 can share the link with the second device 260 via any appropriate method, including text message, instant message, email, etc. After the second device 260 receives the link, the user of the second device can access the link, and the link causes the second device 260 to launch a second browser 230. The second browser 230 can then display the second capture session 250 of FIG. 2A, which reflects the second device 260 connecting to the capture service 136, where the second capture session 250 connects with the first capture session 240 to create shared capture session 280 of FIG. 2B.

Once the shared capture session 280 is connected to the second device 260, the audio, video, screen, and peripheral data from the second device 260 can be transmitted by the shared capture session 280 to the first device 210 through capture service 136. The first device 210 can aggregate or combine the data from the first device 210, with the data from the second device 260 and create an aggregated data stream. The first device can then capture or record the aggregated data stream to create a captured media object that can be stored and provided to the second device 260. The first device 210 can process the audio, video, screen, and peripheral data streams received at the first device 210 and from the second device 260. In one example, the first device can remove the audio data received from the second device prior to sending the captured media object back to the second device to prevent the user of the second device from hearing themselves speak during the shared capture session.

FIG. 2B illustrates an example system after the first capture session 240 of FIG. 2A has been shared with second device 260, creating a shared capture session 280. Once the shared capture session 280 is running on both first browser 220 and second browser 230, the audio, video, screen, and peripheral data from the second device 260 is being transmitted to the first device 210 through the capture service 136. In another example, the capture service 136 can include multiple servers. For example, there can be single or multiple servers to facilitate the initial process for setting up the first capture session 240, generating the share link, and initiating the connection between the first device 210 and the second device 260. Furthermore, the capture service 136 can coordinate the shared capture session 280 on an intermediate server to facilitate communication between the first device 210 and the second device 260. By using an intermediate server, the primary server(s) is freed up to provide the process that initiates a capture session and share the capture session with another user(s) or device(s).

In another embodiment, the shared capture session 280 is then able to receive, for example, a screenshot, camera video, camera photo, screen recording, audio recording, GIF, or any combination of the audio and video generated or received by client devices participating in the shared capture session 280. In this example, the shared capture session 280 can be configured to cause first device 210 to take a screenshot of a specific window displayed on first device 210 and/or to create a screen recording at second device 260. The shared capture session 280 can be configured to cause the first device 210 to use a camera to record a video or a still image. The shared capture session 280 can also be configured to cause the first device 210 to use a microphone to record audio. In a further example, the shared capture session 280 can collect user inputs reflecting peripheral device inputs, including keyboard, mouse, or other peripheral inputs received at first device 210 and/or second device 260. The shared capture session 280 can be configured to cause first device 210 or second device 260 to utilize any hardware, software, or user interface device to receive and/or provide audio, video, screen, and peripheral data to the shared capture session 280.

While first device 210 and second device 260 of FIG. 2B are using the shared capture session 280, capture service 136 can be configured to allow additional sharing of shared capture session 280. However, while sharing is available to the initiating user of the first device 210, the permission to share at the second device 260 can be granted based on the configuration of shared capture session 280. The shared capture session 280 can be configured to only provide sharing to those with permission to share that specific capture session. Alternatively, the shared capture session can be configured to allow every participant to further share the shared capture session 280. When shared capture session 280 is shared, the process operates in similar ways to the share process undertaken to share the first capture session 240. Specifically, in one example, the second device 260 can request to share the shared capture session 280. The capture service 136 will generate a link to the shared capture session 280 and provide that link to the second device 260. Second device 260 can then provide the link to an additional user not yet participating in shared capture session 280.

If, for example, a third or additional device is added to the shared capture session 280, the audio, video, screen, and peripheral data received from the additional devices are sent to the first device 210 via capture service 136 and then combined into the shared capture session 280, as previously described.

Once the shared capture session 280 is completed, first device 210 can send a captured media object that includes data descriptive of the shared capture session 280 to content management system 110, where it is stored at object storage service 116. For example, the captured media object can be a video file, including audio and a screen recording, a camera recording, or a combined screen recording and camera recording (e.g., as illustrated in FIG. 6D). In a further example, the captured media object can be an image file, including, for example, a still image from a camera on first device 210 or a screenshot of the display of the second device 260. In another example, the captured media object can be an audio file, including audio received from a microphone of the first device 210 or from the sound card of the second device 260. While these examples describe the types of files individually, the present description should not be interpreted as limiting and can include combinations of each file type or other types of files that are captured during a capture session.

While object storage service 116 is depicted as being part of content management system 110, it should be appreciated by those of ordinary skill in the art that object storage service 116 can be part of any network-accessible storage. Capture service 136 can then access the captured media object at object storage service 116 and provide the captured media object as requested by a user. And in some embodiments, providing the capture object to a user can be done via a shared link or a shared folder.

Figure 3:
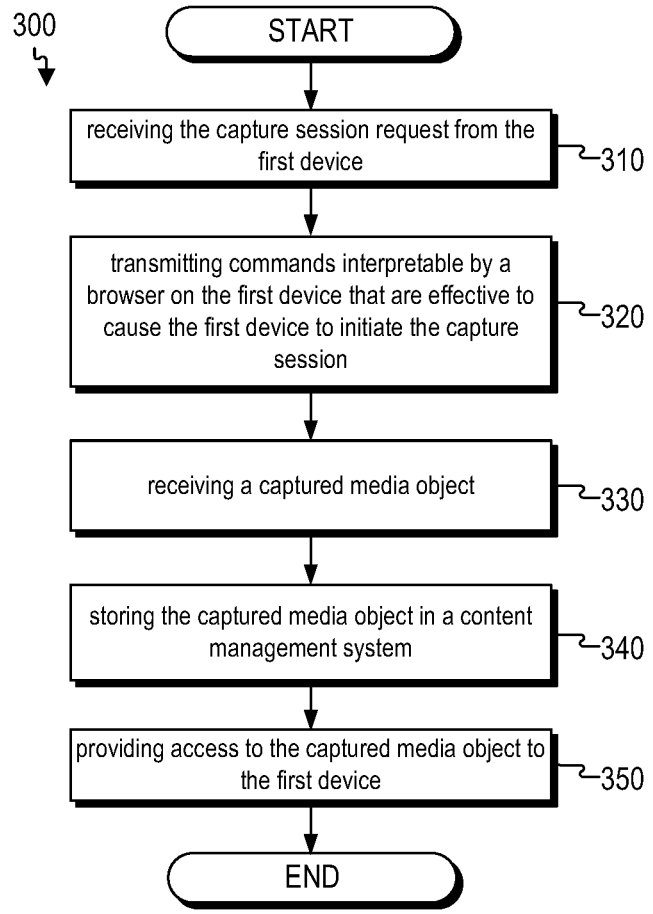
FIG. 3 illustrates an example method for initiating a capture request in accordance with some aspects of the present technology.

FIG. 3 illustrates an example method 300 for initiating a shared capture session. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

The present technology can be used in multiple potential environments to improve the process in those environments. In one embodiment, the system can be useful in any type of professional meeting, where a presentation is provided and shared with a group. A capture session is especially useful when providing and receiving feedback on the presentation to a group of users because the capture session can capture the screen, audio, video, and peripheral data from the users providing feedback on the presentation. When a user determines that it would be useful to receive feedback on the presentation, in this example, the subset of the group of users that have feedback can begin a shared capture session on the first device 210. The user of first device 210 can create the shared capture session with the subset of the group, where the subset of the group provides comments via audio, video, screen, and peripheral data. The captured media object of the subset of the group can then be presented to the larger group reflecting the comments and suggestions from the subset of the group. Using the present technology can facilitate this feedback by using a browser-based application to quickly and easily create the capture session that collects the provided feedback. The present technology assists with ad hoc as well as scheduled capture sessions because it can be easily shared and operated without further software installations and doesn't rely on any users having knowledge of how to configure the capture session. With no software installation needed, a capture session can be quickly deployed on multiple devices to receive instantaneous feedback in group settings.

In another embodiment, the present technology can also take place in the context of an educational setting where a teacher wants to share a lesson with students. In this example, the teacher can begin the presentation on first device 210 of FIG. 2A and initiate the capture session and then generate a link to the capture session. The teacher can then provide the link to the student who is using second device 260. Once the student accesses the link to the shared capture session 280 of FIG. 2B, the teacher and the student can view the work product, and the teacher can provide real-time feedback to the student. Using a shared capture session allows the teacher and the student to comment on and/or change the work product as real-time feedback is provided. Furthermore, after the teacher and student conclude the capture session, the teacher and student can each receive a captured media object that includes the audio, video, screen, and peripheral data, including any comments received during the shared capture session. Further, when both the student and teacher have accounts associated with the content management system 110, the captured media object can be automatically stored in each of their respective accounts at the content management system 110. Once the captured media object is received, if either the student or teacher believes the captured media object is useful to other students, then they are able to share the captured media object upon ending the shared capture session.

The present technology can take place in other contexts as well. The contexts described above are merely exemplary embodiments.

According to some embodiments, the method 300 includes receiving a capture session request from the first device at step 310. For example, the capture service 136 can receive instructions to configure the request for a capture session from the first device 210 of FIG. 2A. When the user wants to begin a capture session, they can indicate their intention through the selection of an interface button on a browser-based application on the first browser 220. This creates a capture session request that is sent to capture service 136, so that capture service 136 knows that the first device 210 wants to start a capture session and what configurations are available for the first device when initiating a capture session.

In one example, the user can interact with the capture service 136 of FIG. 2A through a browser that can have a browser-based application that interfaces directly with the capture service 136. The browser-based application can facilitate generating a link to share a capture session and can facilitate operating the capture session itself. In another example, the user can interact with the capture service 136 of FIG. 2A through a capture application associated with the capture service 136. The capture application can directly interface with capture service 136, and the capture application can facilitate generating a link to share a capture session as well as operating the capture session itself. The capture application can be a standalone application or integrated with other software applications to facilitate capture sessions.

In a further example, the user can interact through a requesting service 205, which can be any service that facilitates requesting a link, sharing the link, and operating the capture session. Some examples include a content management system, a communication platform (such as email, instant messaging, workspace tools), a customer support service (such as ZENDESK or customer support specific to any other service), an IT ticket service (such as JIRA), an educational platform (GOOGLE CLASSROOMS, or BLACKBOARD), and/or a workflow platform (such as TRELLO), etc. The above are merely examples and can be used with each other to perform sharing and operating a capture session. They are provided for context and should not be considered limiting examples of the requesting service 205.

In an additional example, after initiating the first capture session 240, the capture service 136 can provide the user with choices of what forms of media data to capture on the first device 210. For example, the capture service 136 can provide a choice of audio, video, screen, or peripheral data, including combinations thereof. After selection, the capture service 136 can configure the capture session reflecting the user's selection. Alternatively, the capture service 136 can configure the capture session according to default selections associated with the user account at the capture service 136.

According to some embodiments, the method includes transmitting commands interpretable by a browser on the first device that are effective to cause the first device to initiate the capture session at step 320. For example, the capture service 136 may transmit commands interpretable by the first browser 220 on the first device 210 of FIG. 2A that is effective to cause first device 210 to initiate receiving data associated with the capture session. In further examples, the capture service 136 can interact with a capture application associated with the capture service to begin receiving data associated with the capture session, or to the extent a link is provided by the capture service, the commands can be included in the link. The commands interpretable by the browser or the capture application can include one or more calls to an application programming interface (API) that can initiate the capture session.

The first capture session 240 can be configured to receive data for the first capture session 240 by the commands received from the capture service 136, and based on those commands, the first device 210 can interact with the first capture session 240 to collect the appropriate data for that capture session based on the configuration of the first capture session. As the data for the capture session is received, the capture session will begin creating a captured media object that stores the audio, video, screen, and peripheral data associated with the capture session based on the configurations chosen.

During the capture session, the method includes receiving a captured media object at block 330. For example, the capture service 136 may receive the captured media object from the first device 210 of FIG. 2A. The captured media object can be one or more files containing the audio, video, screen, and peripheral data captured by the first capture session at the first device 210. In one example, the browser-based application associated with the capture service 136 will segment the audio, video, screen, and peripheral data captured during the capture session into blocks of data and store the blocks of data at first device 210. Further, the captured media object, stored as blocks of data at the first device 210, can be transmitted continuously to the content management system 110 as the blocks of data are created, or the blocks of data can be sent after the first capture session 240 is completed. Transmitting the blocks of data continuously as they are created has the benefit of making the blocks of data of the captured media object available in real-time, as they are received by the content management system 110.

According to some embodiments, if the capture session request is configured to link a workflow to the capture session at step 335, the method includes triggering a workflow associated with the capture session request at step 340. For example, the capture service 136 may trigger a workflow associated with the capture session request. The workflow could alert the users taking part in the capture session that the capture session is available and can track progress associated with a project related to the capture session. A further example is that a technical support session can step through a linked workflow. In such embodiments, capture service 136 can trigger the workflow, which may be defined at another service, during the capture session.

According to some embodiments, if the capture session request is not configured to link to a workflow to the capture session at step 335 or after the workflow at step 340 is complete, the method includes storing the captured media object in a content management system at step 350. For example, the capture service 136 can receive and store the captured media object in a location in the content management system 110, which may be handled by object storage service 116 of FIG. 2A. For example, the storage location can be based on the user account associated with the user of the first device 210 or any other storage location available and identified in the capture session request. Alternatively, the first device 210 can send the captured media object directly to the content management system 110 via client application 152 on the first device 210. In other embodiments, if a link is used to initiate or share the capture session, information associated with the link to the capture session can include the location at the content management system 110 to store the captured media object. The link can also provide the first device 210 or a device that joins the first capture session 240 with the necessary permissions to store the captured media object at the specified location within the content management system 110.

In one example, the location in the content management system can be specified by the user when configuring the capture session request for the first capture session 240. In some embodiments, the location in the content management system is a shared folder identified in the capture session request. The shared folder can be shared with team members that include, for example, the user of the first device 210.

According to some embodiments, the method includes providing access to the captured media object to the first device at step 360. For example, the capture service 136 may provide access to the captured media object to the user of the first device 210. The capture service 136 can notify the user at first device 210 when the captured media object is received by the content management system 110 of FIG. 2A. The notification sent to the first device 210 can include a link to access the captured media object at the location in which it is stored. In some embodiments, the notification may only need to inform the user that the captured media object is stored in an accessible location, such as a folder in content management system 110.

In some embodiments, the capture service 136 can associate the captured media object with data at the requesting service 205. For example, when a workflow is triggered, the capture service can associate the capture object with a particular ticket associated with a technical support request, a student ID, a project code name, a communication thread, etc.

In some embodiments, the notification that provides access to the captured media object can be an email, such as an email thread between the user and any recipient invited to join a shared capture session. In some embodiments, the notification can be a messaging thread as part of a website, a communications service for instant messages, or group spaces.

Figure 4:
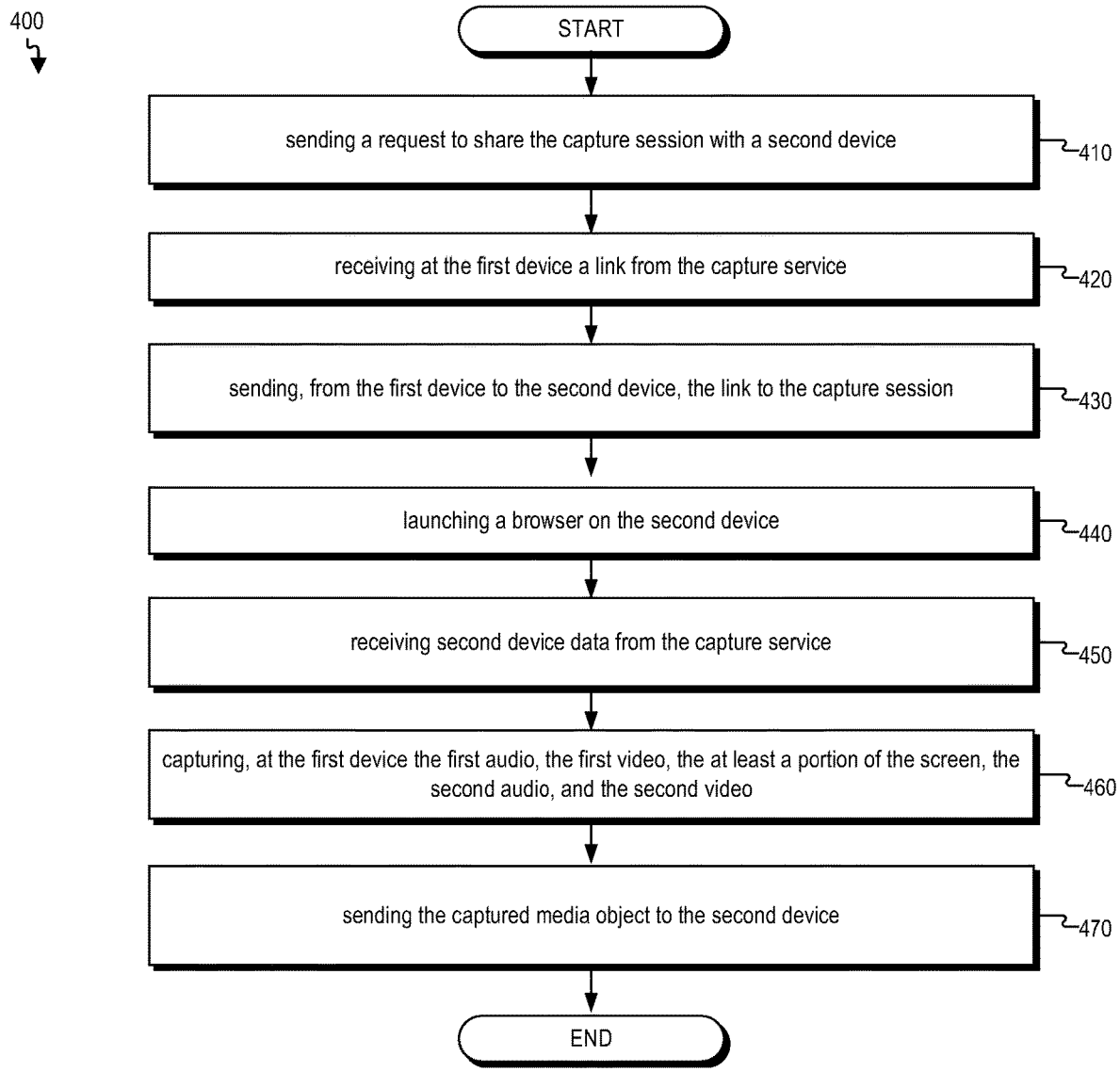
FIG. 4 illustrates an example method for sharing a capture session with a second device in accordance with some aspects of the present technology.

FIG. 4 illustrates an example method 400 for sharing the capture session with a second device so that the capture session receives data from both the first device and the second device. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method includes sending a request to share the capture session with a second device at step 410. For example, after step 320 in FIG. 3, when the first device 210 of FIG. 2 receives the commands interpretable by a browser or capture application on the first device that are effective to cause the first device to initiate the capture session, the user can select an interface button, dialogue box, or link that sends a sharing request from the first device 210 to the capture service 136, indicating that the user of the first device 210 wants to share the first capture session 240. For example, as shown in FIG. 6D, the user is able to click on the share interface button, 656, to indicate that the user wants to initiate the process of sharing the first capture session 240 of FIG. 2A with another user. Sharing the capture session allows a user to have a capture session that captures audio, video, screen, and peripheral data from multiple devices. Based on this request, capture service 136 will generate a link capable of launching a browser on the second device configured to join the first capture session 240.

According to some embodiments, the method includes receiving, at the first device, a link from the capture service at step 420. For example, after the capture service 136 generates a link to the first capture session 240 to the first device 210 of FIG. 2A, the capture service can communicate the link to the first device 210. When received, the browser-based application can place the link directly on the clipboard of the first device 210 to facilitate sharing the link with another user.

According to some embodiments, the method includes sending, from the first device to the second device, the link to the capture session at step 430. For example, after the first device 210 of FIG. 2A receives the link to the first capture session 240, the user of the first device 210 can then send the link to a second user at the second device 260. The first device can provide the link to the second device 260 via any communication method, e.g., email, instant messenger, social media, text, etc. In a further embodiment, the capture service 136 can provide the link to the second device based on information included in the capture session request or the first device can provide the information for a preferred communication method to capture service 136 so that the link is provided directly to the second device 260. The link communicated to the second device 260 will allow the second user at the second device 260 to access the shared capture session 280. When the second device 260 receives the link, the second user of the second device 260 can then access the shared capture session 280 by clicking on or accessing the link.

According to some embodiments, the method includes launching a browser on the second device at step 440. For example, when the second device 260 of FIG. 2A receives the link to the first capture session 240, the user of the second device 260 can access or click on the provided link, which can launch the second browser 230 on the second device 260, where the shared capture session 280 can run in the second browser 230. Alternatively, the link, when accessed, can launch a capture application associated with the capture service 136 that can connect to the shared capture session 280 of FIG. 2B. Upon the second device 260 of FIG. 2B joining the shared capture session 280, the shared capture session 280 can start receiving and transmitting audio, video, screen, and peripheral data, based on the configuration of shared capture session 280, from the second device 260 to the first device 210 through capture service 136. Typically, upon joining the shared capture session 280, the shared capture session 280 will transmit audio and video data, with the option to add screen and peripheral data to the shared capture session 280. Therefore, by sharing the link associated with the first capture session 240, the first device 210 can invite other users to the shared capture session 280. Furthermore, the link generated by the capture service 136 can include information, a token, a cookie, etc., identifying configuration choices associated with the first capture session 240 that can be used to configure shared capture session 280 at the second device 260. The link can also include identifying information related to the first device 210, and when the second device joins the shared capture session 280, it can provide identifying information to the capture service 136 regarding the second device 260. The identifying information can be used by the capture service 136 to connect the first device 210 with the second device 260 and facilitate shared capture session 280.

When the second device 260 of FIG. 2B launches the second browser 230, the shared capture session 280 is subsequently available to transmit audio, video, screen, and peripheral data from the second device 260 to the first device 210. The second device 260 sends the data received by shared capture session 280 on the second device 260 to the capture service 136, which provides the data to the shared capture session 280 on the first device 210. The shared capture session 280 on the first device 210 can then aggregate and process the data from the second device 260. Typically, the first device 210 will aggregate the audio, video, screen, and peripheral data collected at the first device 210 with the audio, video, screen, and peripheral data received from the second device 260 through the shared capture session 280. By collecting and aggregating the data from both devices, the shared capture session 280 facilitates collaboration between the users of the first and second devices, as notes, comments, and changes can be captured and stored for later review and comment. The data collected, transmitted, and aggregated during shared capture session 280 can also change depending on what configurations are chosen at the first and second devices. For example, typically, only one screen is shared at a time, the first user can stop sharing video data from the first device 210 during the shared capture session 280, the second user can mute the microphone at the second device 260 during the shared capture session 280, or the shared session can be configured to only capture audio and video from the second device 260, amongst other combinations of audio, video, screen, and peripheral data received and collected during the shared capture session 280.

According to some embodiments, the method includes receiving second device data from the capture service at step 450. For example, in FIG. 2B, the capture service 136 receives the data from the second device 260 during shared capture session 280. After the capture service 136 receives data from the second device 260 during shared capture session 280, the capture service 136 can transmit the data received from the second device 260 to the first device 210. The first device 210 can then aggregate and process the data from each device to create a single data stream that includes the audio, video, screen, and peripheral data from each device. This single data stream can then be recorded or captured to create a captured media object that can be returned to the second device and automatically stored in the content management system 110. Providing the single data stream of aggregated data to the second device 260 allows the user of the second device to experience the same shared capture session as the user of the first device because the data displayed is the same and it is processed in the same way. Once the feeds are aggregated into the single stream of data, the first device 210 can capture and store the single stream of data as a captured media object on the first device 210 and provide the captured media object to the second device.

In addition to aggregating the data from the first and second devices, the first device 210 is also able to process the data from both the first device and the second device. For example, the first device can remove audio data received from the second device 260 so that only the first audio from the first device 210 is aggregated, captured, and returned to the second device 260. By processing the stream and removing the audio data to the second device, when the audio data is provided to the second device 260, there is no redundant audio that was captured at both the first device 210 and the second device 260.

According to some embodiments, the method includes capturing, at the first device, the first audio, the first video, the at least a portion of the screen, the second audio, and the second video at step 470. For example, once the first device 210 of FIG. 2B creates a single stream of data by aggregating the data received from all devices that joined shared capture session 280, the first device can record or capture the single stream of data to make a captured media object that can be stored and shared. Further, the first device 210 is able to provide the captured media object to the second device 260, so that the first user and second user are viewing the same captured media object.

According to some embodiments, the method includes sending a captured media object from the first device to the content management system for storage in an account associated with the user of the first device at step 470. For example, in FIG. 2B, when the first device 210 creates the captured media object, the first device 210 is able to store the captured media object locally on the first device 210. In one embodiment, the user at first device 210 is logged into a user account at content management system 110. By being logged into a user account, the capture service can recognize the appropriate storage location at the content management system for the captured media object. The first device 210 is then able to transmit the captured media object to the capture service 136 for storage. The content management system 110 is able to store the captured media object in objects storage service 116 based on the user account associated with the user at the first device 210. In a different embodiment, a user can manually store the captured content item at the content management system 110. Additionally or alternatively, the capture service 136 can automatically store the captured media object, as it is being produced, in a folder associated with the user of the first device 210. For example, when the first capture session 240 of FIG. 2A is initiated, it can be associated with a user account at the content management system 110. With this information, the capture service 136 can store the first capture session 240, and after it is shared, shared capture session 280 of FIG. 2B, at a folder associated with the user at content management system 110.

Similarly, when the captured media object is received by the second device 260, if the user of the second device has a user account associated with the content management system, the second device 260 can store the captured media object locally and send the captured media object to the content management system 110 to store in the object storage service 116. If the user of the second device 260 has an application associated with the content management system 110 on the second device 260, then the application associated with the content management system can be used to identify an appropriate storage location for the captured media object. Furthermore, if a shared folder at the content management system 110 is identified when the shared capture session 280 of FIG. 2B is initiated, the capture service 136 can automatically store the captured media object at object storage service 116 in the identified shared folder.

Figure 5:
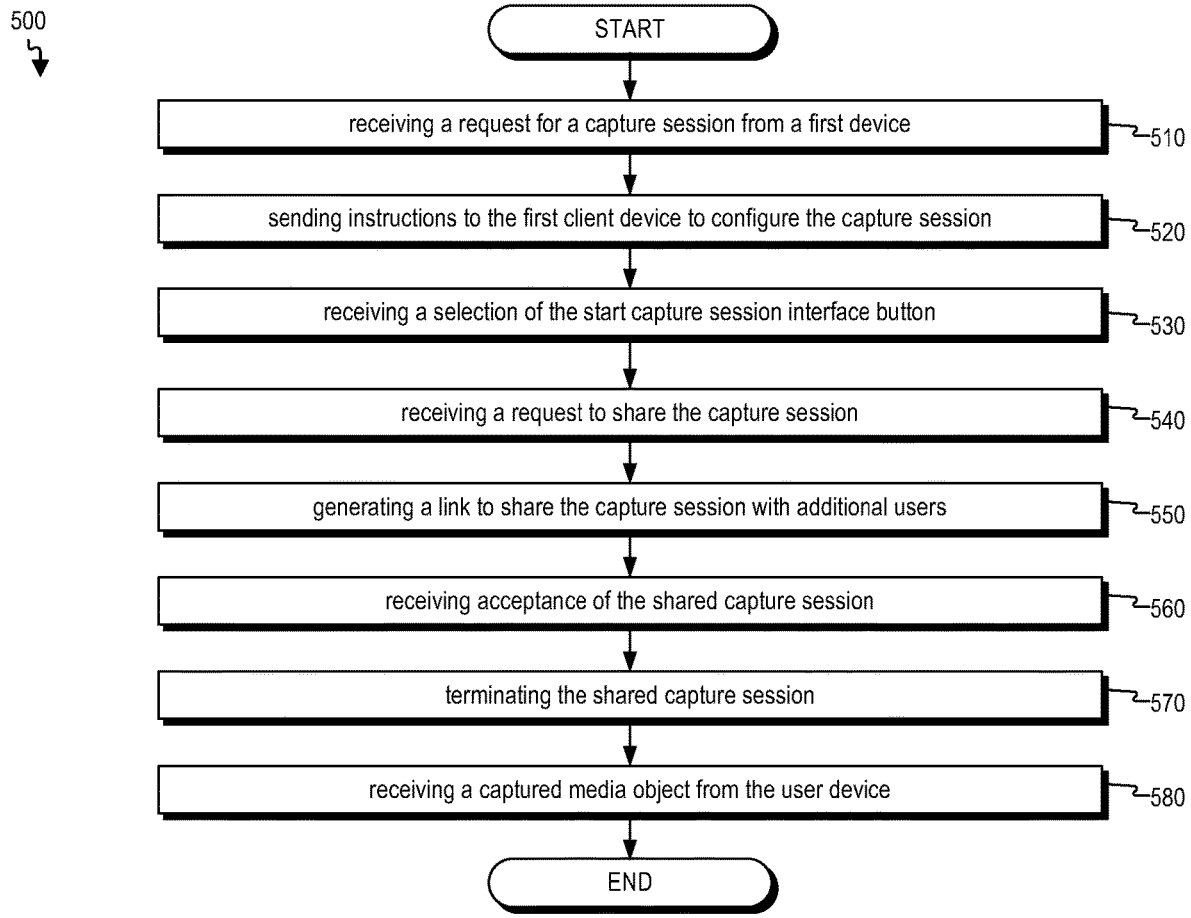
FIG. 5 illustrates an example method for receiving a request to share a capture session with a second device in accordance with some aspects of the present technology.

FIG. 5 illustrates an example method 500 for starting, operating, and ending a shared capture session at a capture service. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method includes receiving a request for a capture session from a first device at step 510. For example, the first device 210 of FIG. 2A may send a request for the first capture session 240, which can be received by capture service 136. Once the capture service receives an indication that the user would like to begin a capture session, e.g., first capture session 240, the capture service 136 can send instructions to the first device to configure the capture session process of receiving audio, video, screen, and peripheral data at the first device 210.

In some embodiments, the request for the media capture takes place through an application associated with the capture service 136 or through a browser-based application. In other embodiments, the user can initiate the capture session using a link that launches the capture session in the browser or an icon within the capture application associated with the capture service 136. The capture application associated with the capture service 136 or the browser-based application sets up the capture session as configured by the user.

According to some embodiments, the method includes sending instructions to the first client device to configure the capture session at step 520. The instructions can include presenting options for taking part in a capture session and/or a start capture session user interface button. For example, the first device 210 of FIG. 2A may present a start capture session interface button that is presented in response to the received capture session request.

In some embodiments, prior to presenting the start capture session interface button, the browser-based application or interface of the capture application associated with capture service 136 can provide further options regarding the capture request. In some embodiments, some options have been pre-configured by the user of the first device to establish a default capture session. For example, the options can include a requirement to have a camera on, a location to store the media capture object, whether the media capture includes a screenshot, camera video recording, camera photo, screen video recording, audio recordings, or GIF, or any combination of the these, a length of the media capture, etc. In some embodiments, the method can start the capture session as pre-configured by the user at the first device. However, in some embodiments, the second user at the second device 260 may be presented with additional options or may be presented with a user interface to confirm some configurations pre-selected by the user of the first device.

In some embodiments, the capture service 136 of FIG. 2A can send a selection of capture session configurations to first device 210 prior to providing the start capture session user interface button. While some options can be pre-configured by the user, the user can also select additional configurations. Some configurations may not have been pre-configured, or the user might override the pre-configured selections by de-selecting a configuration. In some embodiments, there are configurations that are specific to the user. For example, a user can make a selection of a specific window or screen to include in the capture session. In some embodiments, the user initiating the capture session can include configuration requirements for joining a shared capture session and prohibit another user from changing certain configurations. This can be useful for security purposes or ensure participation in a shared capture session. An example of a user interface showing some configurations that can be selected is illustrated in FIG. 6B. An example of a user interface showing options regarding which window or screen to capture is illustrated in FIG. 6C. Examples of a start capture session interface button include interface button 620 in FIG. 6A or interface button 642 in FIG. 6C.

According to some embodiments, system permissions may need to be granted prior to the first device 210 or second device 260 providing access to a camera or a window is needed. For example, the first device 210 or second device 260 may request permission to permit a web interface to have access to a camera, a microphone, and/or a window to include in the capture session. The first device 210, the second device 260, or the operating system executing thereon may require the web interface to explicitly request permission or otherwise have the user's permission before starting a capture session. An example of a user interface showing such a permission request is illustrated in FIG. 6B at 630.

According to some embodiments, the method includes receiving a selection of the start capture session interface button at step 530. For example, the first device 210, can send an indication to capture service 136 that the selection to start the first capture session 240 has been selected by the user of the first device 210 of FIG. 2A. If shared, the second device 260 can send an indication to capture service 136 that the user of the second device 260 in FIG. 2B has selected the start capture session user interface button. Examples of the start capture user interface buttons include interface button 620 in FIG. 6A, or interface button 642 in FIG. 6C. Similar user interface buttons are provided to either the first device 210 in FIG. 2A or after sharing to second device 260 in FIG. 2B.

In one embodiment, the first device 210 of FIG. 2A can receive audio, video, screen, and peripheral data after receiving the selection of the start capture session user interface button. The data can be collected by, for example, the browser-based application at the first browser 220 and is based on the configuration options selected for the first capture session 240. In another example, the data can be collected by the capture application associated with the capture service 136.

According to some embodiments, the method includes receiving a request to share the capture session at step 540. For example, in FIG. 2A, the first device 210 can transmit the request to share the capture session after receiving the selection of the share user interface button, e.g., share interface button 656 in FIG. 6D. The user selection of the share interface button 656 transmits to the capture service 136 the request to share the first capture session 240 with another user or device. Once the request to share the first capture session 240 is received, the capture service 136 can generate a link to the first capture session 240. In another example, it is possible for the capture service 136 to store the generated link so that a subsequent request to share received from the first device 210 can rely on the same link to share the first capture session 240.

According to some embodiments, the method includes generating a link to share the capture session with additional users at step 550. For example, upon the capture service 136 receiving the share request, the capture service 136 can generate a link to the capture session, e.g., first capture session 240 of FIG. 2A. The generated link allows the user of the first device 210 to share the capture session with another user device, e.g., second device 260 of FIG. 2A. The link can be shared either directly through the capture service 136 to an identified second user or provided to the first device 210 so that the user of the first device 210 can share the link with the second device 260. For example, the request to share the first capture session 240 can include information identifying the device or user that is the intended recipient of the shared capture session. The identifying information can include a user account, a phone number, an email address, a third-party username, etc., that can be used by the capture service 136 to share the first capture session 240. In addition or alternatively, providing the link to the first device 210 allows the first device 210 to share the capture session with the intended device or user through communication methods, including email, text, instant message, etc. Once provided to the second device, the second user can access the second capture session 250 of FIG. 2A, and once sharing is confirmed, join shared capture session 280 of FIG. 2B.

According to some embodiments, the method includes receiving acceptance of the shared capture session at step 560. For example, after the second device 260 of FIG. 2A receives the generated link from the first device 210, the second user of the second device 260 can access the link. Accessing the link launches a browser and starts the process of the second device 260 joining the shared capture session 280 of FIG. 2B. Upon receipt of the acceptance, the capture service 136 can send instructions to configure the shared capture session 280 on the second device 260 to receive the appropriate audio, video, screen, and peripheral data from the second device 260, based on the configuration settings of shared capture session 280.

In one embodiment, the capture service 136 can receive the data from the second device 260. One process available to capture service 136 is the use of webRTC or other similar programs to communicate with the capture service 136 in real-time using the appropriate application programming interface (API). The capture service can then merge or link the connections between the first device 210 and the second device 260. Once the capture service 136 receives and links the two streams, the system can communicate the data from the second device 260 to the first device 210. Similarly, the first device 210 can use the connection to provide the captured media object to second device 260. After linking the two devices, the first device 210 can receive the data from the second device 260, aggregate the data from the two devices, and then store and transmit the captured media object.

According to some embodiments, the method includes terminating the shared capture session at step 570. For example, capture service 136 can receive an indication from the first device 210 to terminate the shared capture session 280 of FIG. 2B for both the first device 210 and the second device 260. For example, the termination can take place in response to receiving an indication that activated an interface button to stop the recording, an expiration of a timer, or loss of connectivity to the capture session. An example of a user interface button to stop the recording is illustrated in FIG. 6E at the stop sharing interface button 652, which would stop shared capture session 280 from sharing data with the users taking part in shared capture session 280. When the capture service 136 receives the indication that the user of the first device 210 wants to end the shared capture session 280, the capture service 136 can send instructions to each device in the shared capture session to stop capturing and sending data. In another embodiment, if the indication to terminate the shared capture session 280 is received from the second device 260, capture service 136 will only terminate the second device 260's involvement in the shared capture session 280. For example, the capture service 136 would send instructions to the second device 260 to stop collecting and sending data. However, in another embodiment, it is possible for the user of the first device 210 to provide permission to the additional users taking part in the shared capture session 280 to end the shared capture session 280 for all other users.

In another embodiment, after terminating the shared capture session 280, the capture session can send instructions to provide a preview of the captured media object prior to finalizing storage. The browser-based application on the first device 210, can then provide a preview of how the captured media object will appear when stored. In this example, the user can then determine if they would like to store the captured media object or discard the captured media object and being a new capture session.

According to some embodiments, the method includes receiving a captured media object from the user device at step 580. For example, after terminating the shared capture session 280 and once the first device 210 has received and captured the aggregated data, the first device 210 can store the captured media object locally, the first device 210 can transmit the captured media object to the content management system 110, as well as provide the captured media object to all devices that took part in the shared capture session 280. FIG. 6F, illustrates an example of a user interface after the captured media object is sent. In one embodiment, the first device 210 sending the captured media object can occur without further user involvement. Thus, the user does not need to figure out how to send a large file or even figure out where the captured media object has been saved. The whole process can occur based on the configuration of the shared capture session without further user involvement.

In another embodiment, when the capture service 136 knows the user accounts associated with each user in the shared capture session, the capture service can directly store the captured media object in the appropriate user account after receiving the captured media object from the first device 210. For example, the capture service 136 can store the captured media object for either the first device 210 or the second device 260 at a location in the content management system 110 based on the user account associated with each user of those devices.

FIGS. 6A, 6B, 6C, 6D, 6E, and 6F illustrate a series of user interfaces that the first device 210 and second device 260 of FIGS. 2A and 2B can display, including an interface for starting and progressing through the capture session, receiving a capture session request, and an interface for sending the sharing the capture session.

Figure 6A:
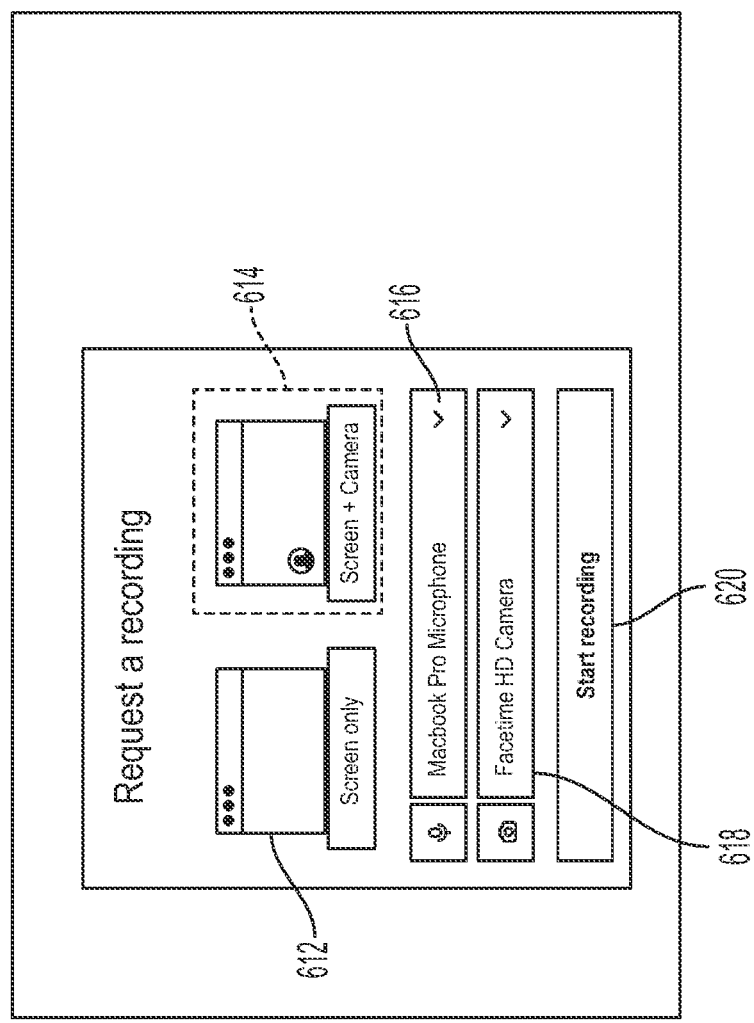
FIG. 6A illustrates an example of a user interface showing configurations available for a capture session in accordance with some aspects of the present technology.
Figure 6B:
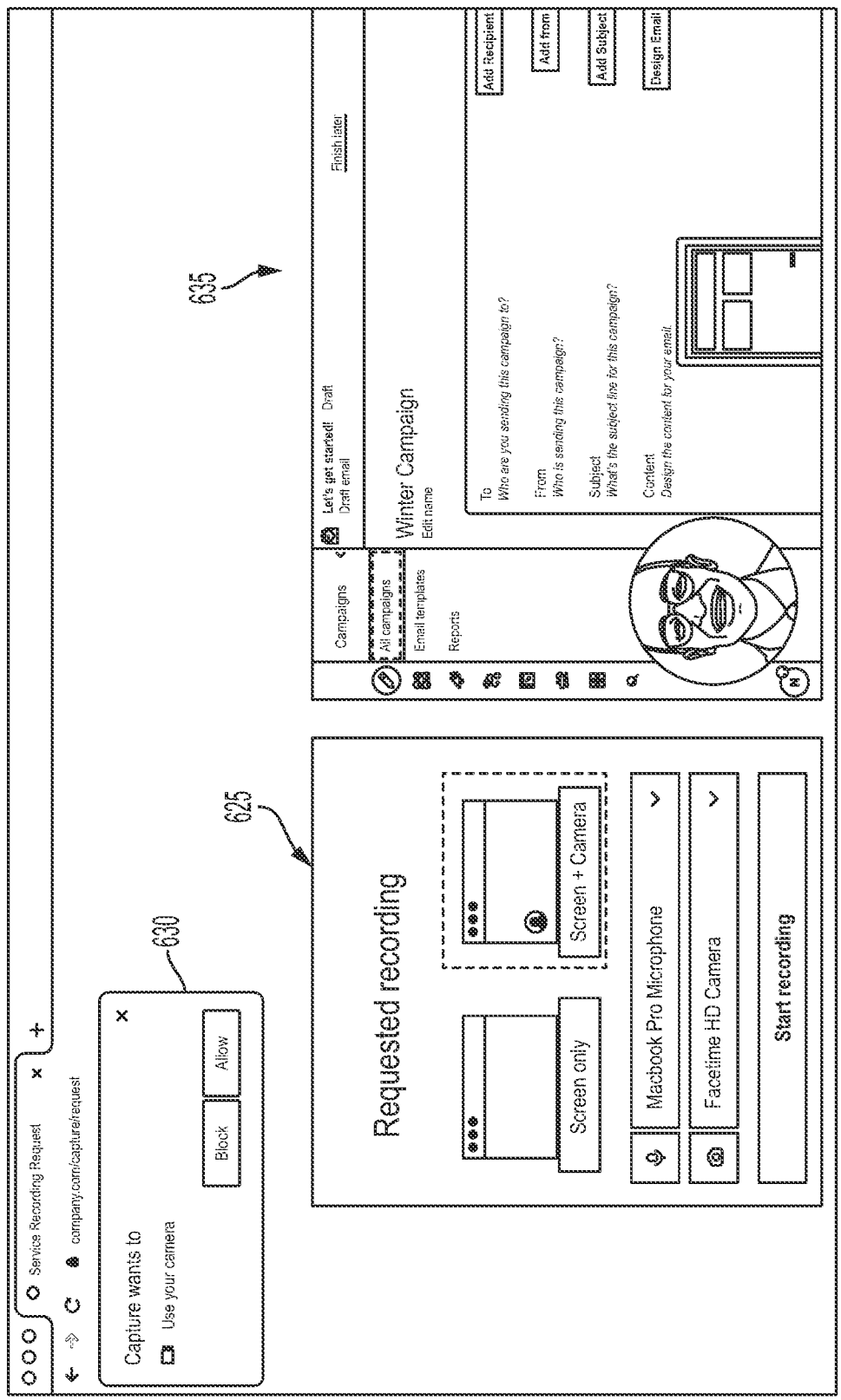
FIG. 6B; illustrates an example of a user interface showing permission requests available to capture sessions in accordance with some aspects of the present technology.
Figure 6C:
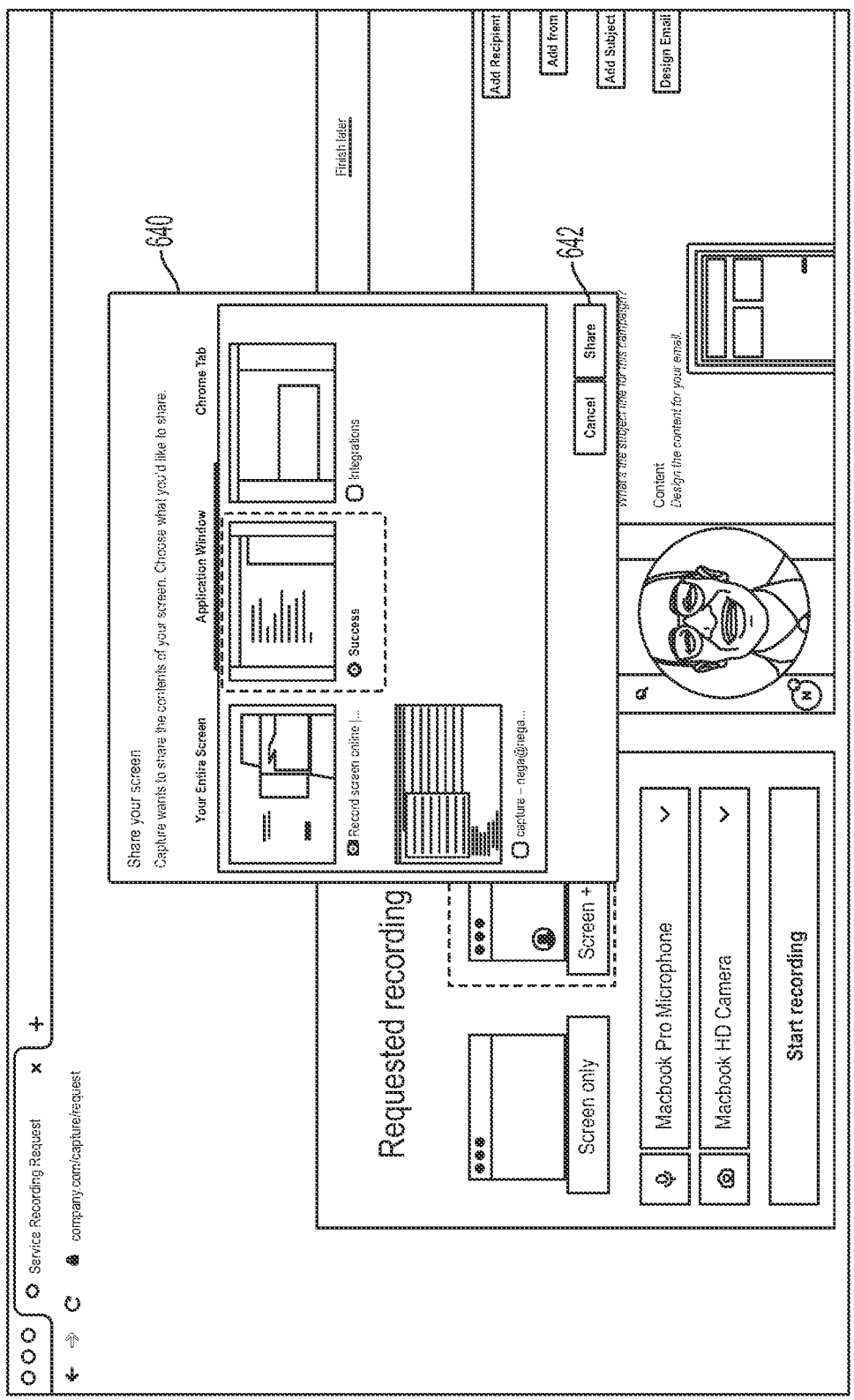
FIG. 6C; illustrates an example of a user interface showing configurations available for screen capture during a capture session in accordance with some aspects of the present technology.
Figure 6D:
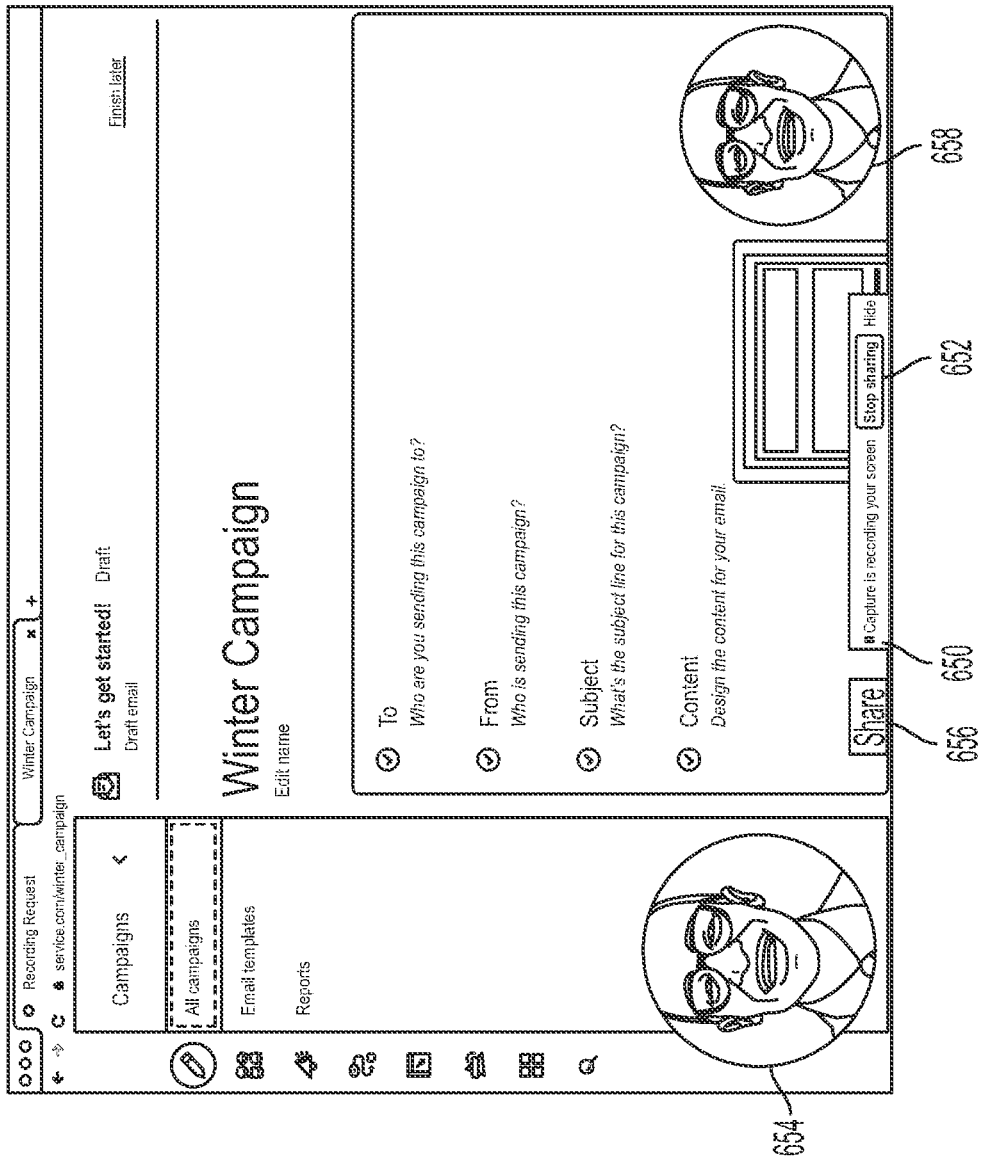
FIG. 6D; illustrates an example of a user interface during a shared capture session in accordance with some aspects of the present technology.
Figure 6E:
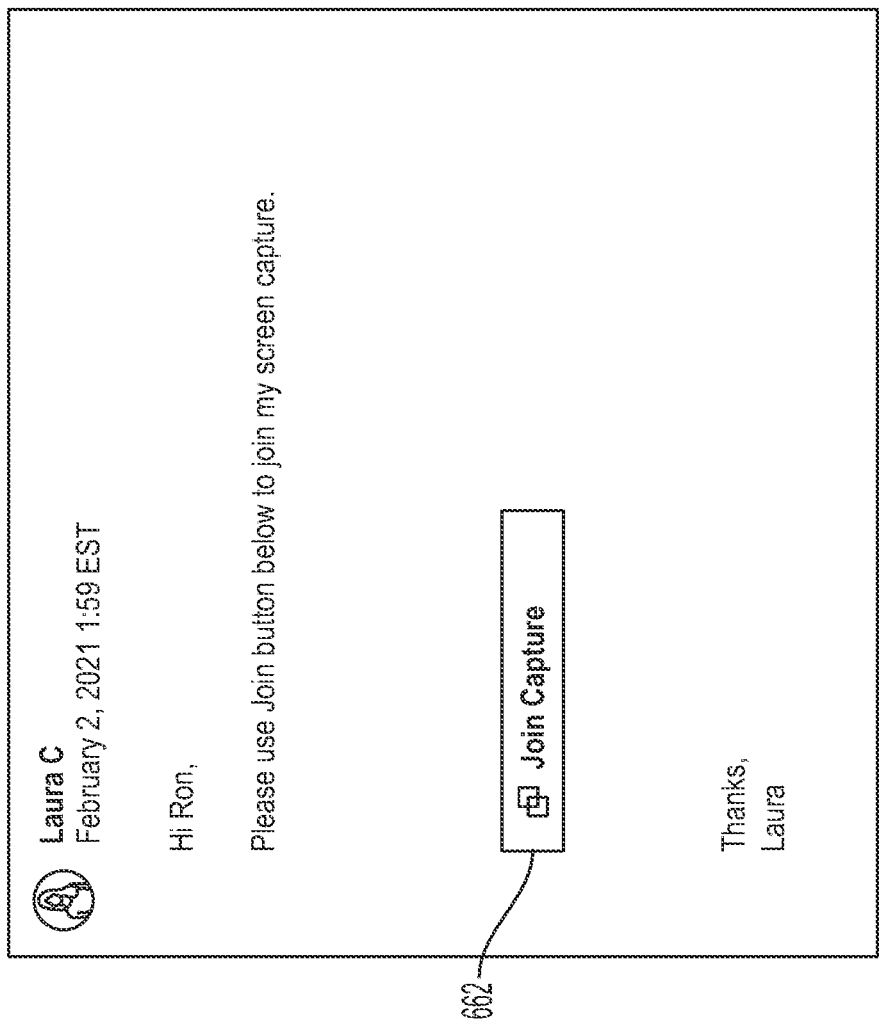
FIG. 6E illustrates an example of a request to join a shared capture session in accordance with some aspects of the present technology
Figure 6F:
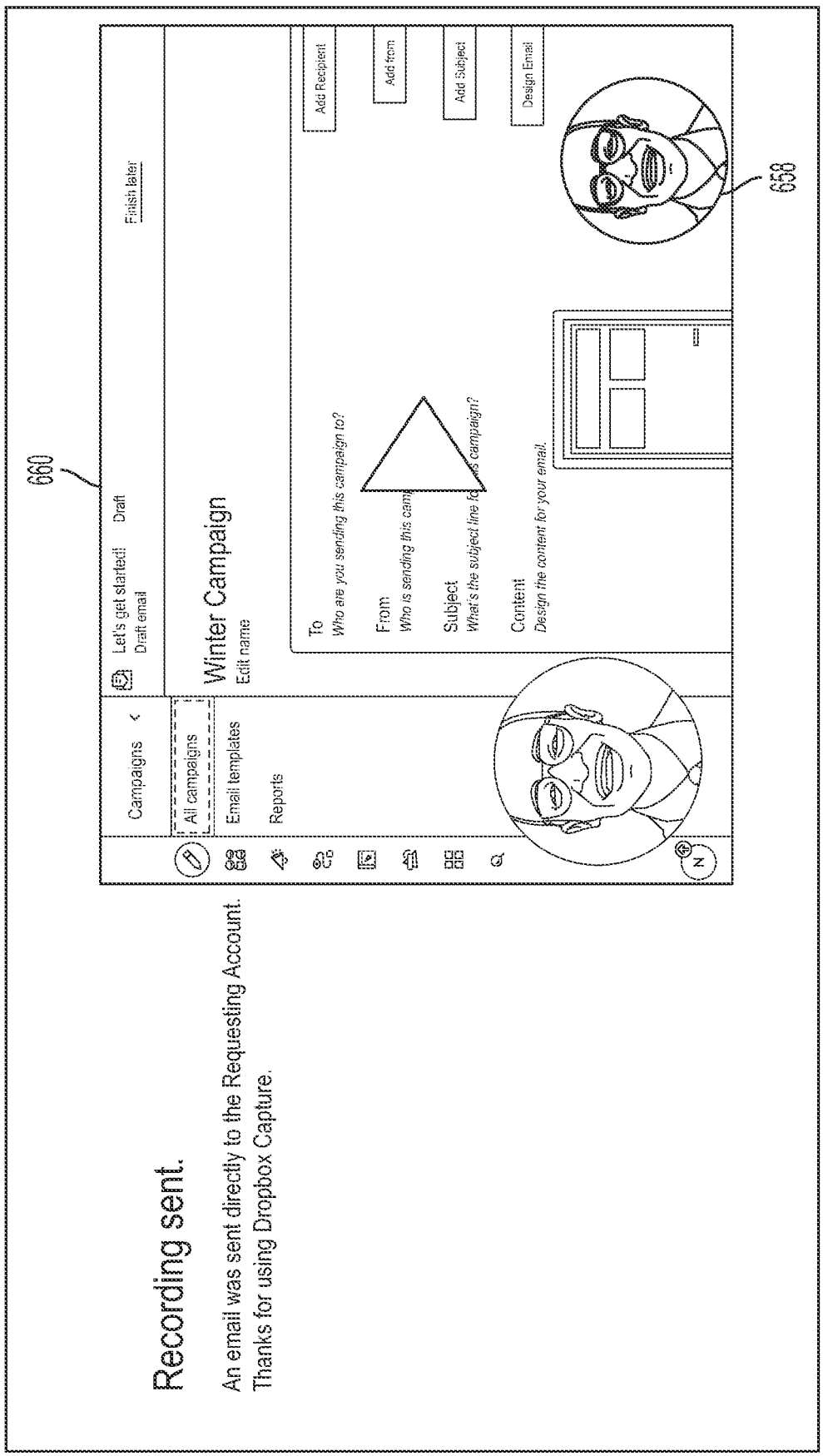
FIG. 6F illustrates an example of a user interface after concluding a shared capture session in accordance with some aspects of the present technology.

FIG. 6A illustrates an example of a user interface showing options that can be selected by a user of the present disclosure. After the user has interacted with the capture service via a browser-based application on the first device 210 or the second device 260, the browser-based application can be used to initiate the capture session. FIG. 6A illustrates an example of a few options available in the browser-based application that can be used to initiate the capture session. In one embodiment, the user can preconfigure selections of some of these options. For example, in FIG. 6A, the user can preconfigure the capture request to record both a screen displayed on the first device 210 and a video of the user from the camera on the first device 210. This configuration can be determined because the option for "screen+camera" 614 is already selected. When the capture session is shared, this same process happens at the second device 260, which allows the user of the second device to provide selections that are suitable for the second device 260 and can include predetermined selections by the user of the first device.

In some embodiments, the first user may make alternative selections even if certain configurations are pre-selected. In some embodiments, the first user may not have any pre-selected configurations, which causes the first user to make some selections to begin the capture session. FIG. 6A provides configurations to choose whether to record a "screen only" 612, which would record the screen of the first device 210 or to record the "screen+camera" 614 as described above. Additionally, the first user can select a source of audio using 616. The user can also select a source of video 618. Once the first user has selected the desired configuration, the first user can select the interface button 620 to start recording on the first device, thereby initiating the capture session. If the first capture session 240 of FIG. 2A is shared, and the second user of the second device 260 is presented with a similar interface to configure the shared capture session for second device 260, which can begin when the icon to begin recording is selected.

In some embodiments, a selection of the start recording interface button 620 can begin the capture session as described above. However, in some embodiments, a selection of the start recording interface button 620 can lead to further user interfaces to give permissions and/or to select specific screens or windows for recording.

FIG. 6B illustrates an example of a user interface showing a permission request. In some embodiments, first device 210 may require that the user confirm that the browser-based application performing the capture session is authorized to access the hardware and/or software necessary to capture the audio, video, screen, or peripheral data associated with the configurations selected by the user. This can take the form of providing the web browser with permissions to record other windows, use a microphone, use a camera, etc. An example of a dialogue box requesting permission to use the camera to record video is shown as 630 in FIG. 6B.

FIG. 6B also shows a browser window showing the configuration options 625 addressed in FIG. 6A. FIG. 6B also shows an example window 635 that illustrates how the capture session might appear when screen data is combined with video data.

FIG. 6C illustrates an example of a user interface showing options regarding which window or screen to capture for the capture session. For example, when first device 210 and/or second device 260 has multiple applications, windows, or tabs open in an internet browser, the browser can display a popup window or modal 640, providing the user with options to choose what content to include in the capture session. In the example shown in FIG. 6C, the user could choose to capture their entire screen, just a particular application window, or a particular tab of an internet browser. Once the desired option is selected, the first device 210 can capture the appropriate data for the capture session when the user selects the interface button 642 and begins sharing the captured data.

FIG. 6D illustrates an example of a user interface during the capture session and buttons to share the capture session and to stop sharing the capture session. In FIG. 6D, for example, a web page is selected for the capture session, and during the capture session, the user will see the display of the webpage with an additional user interface component 650 indicating that the capture session is occurring and recording the web page. During the capture session, the first user can, for example, provide a demonstration that shows progress on a project, answer questions on an assignment, or whatever else they desire to demonstrate via the capture session.

During this demonstration, the first view 654 of the first user may be shown in the capture session. If the first view 654 of the first user gets in the way of the demonstration, the first user can interact with the first device 210 to select and drag the first view 654 to another location on the screen. The user interface can also include a view of other users present if it is a shared capture session. For example, in a shared capture session, a second view 658 is viewable in the user interface, reflecting the video feed from the second user's device. The second view 658 can also be represented by an icon, a photo, or an image of the second user's choice. While only one other user is shown in the user interface in this example, the system will support more users and can alter the user interface to accommodate the additional users.

During the capture session the first user of first device 210 of FIG. 2A can share the capture session with additional users. Sharing the capture session can happen via the share interface button 656 in FIG. 6D. When the second user accepts the shared capture session request, the second view 658 of the second user may be presented on a portion of the screen, similar to the view provided of the first user, first view 654. By including both users in the capture session, the first and second users both have their camera views present on a shared capture session. Further, like first view 654, if the second view 658 of the second user gets in the way of the demonstration, the first user can interact with the first device 210 to select and drag the second view 658 to another location on the screen. Further, the first device can alter the size of the second view 658 to accommodate additional users or prevent interference with the user interface of the shared capture session.

Once the first user has completed their demonstration, they can select interface button 652 to end the sharing and terminate the shared capture session.

FIG. 6E illustrates an example of a share screen for sharing the capture session. More specifically, FIG. 6E illustrates a messaging interface showing a communication coming from a first user to a second user where the first user has included a join request 662. The join request 662 allows the second user to join the capture session initiated by the first user and create a shared capture session. Join request 662 can be displayed in the form of a selectable user interface button, a uniform resource locator (URL), or any other form that allows the second user to accept the invite to the shared capture session. The second user can select the user interface button for the join request 662, which can cause second device 260 to launch a web page related to the capture session and join the capture session of the first user.

FIG. 6F illustrates an example of a user interface after the captured media object is sent to users from the shared capture session. For example, after the first device 210 of FIG. 2B completes the shared capture session 280, the first device 210 can share the captured media object by sending it to the second device 260. After sending the captured media object 660, the first device can display an interface like FIG. 6F, confirming the captured media object was sent. Additionally, the user can click on the play button of the captured media object 660, which is displayed in the user interface to review the recording of the capture session. In some embodiments, rather than displaying an image from the captured media object 660, the user interface may provide a link to the captured media object instead.

While FIGS. 6A-6F show example user interfaces for capture sessions and only show options for a screen capture or screen capture+video. It should also be understood that other configurations are possible. For example, the capture session request can be a request to capture a screenshot, camera video recording, camera photo, screen video recording, audio recording, GIF, peripheral inputs, or any combination of these.

Figure 7:
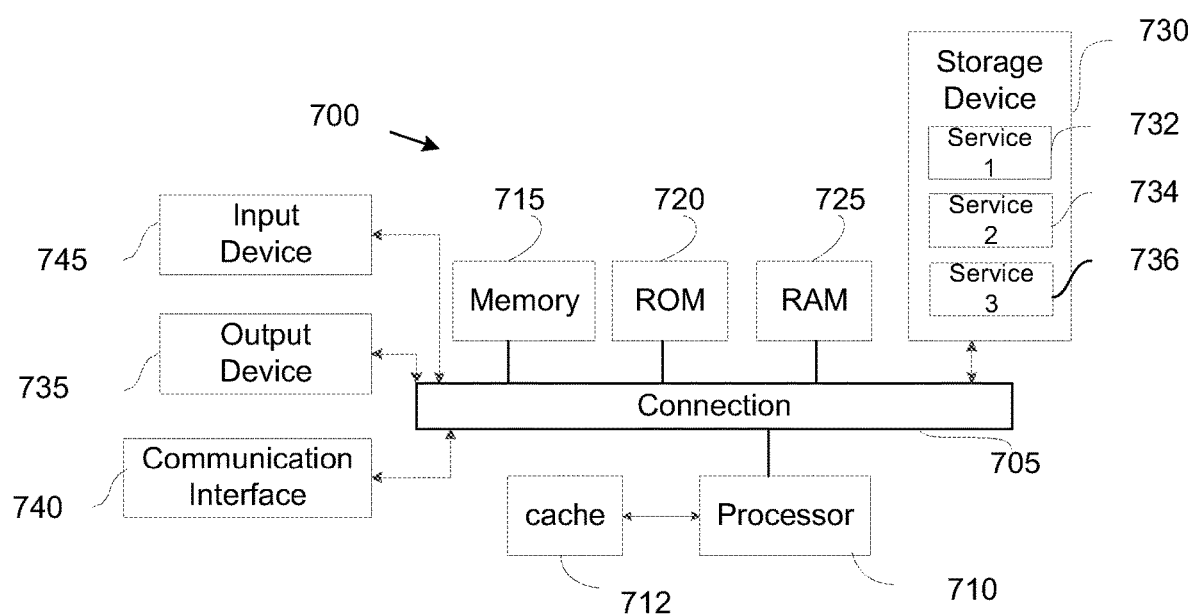
FIG. 7 illustrates an example of computing system 700 in accordance with some aspects of the present technology.

FIG. 7 shows an example of computing system 700, which can be, for example, any computing device making up the capture service 136, the requesting service 205, or first device 210, or any component thereof in which the components of the system are in communication with each other using connection 705. Connection 705 can be a physical connection via a bus or a direct connection into processor 710, such as in a chipset architecture. Connection 705 can also be a virtual connection, networked connection, or logical connection.

In some embodiments, computing system 700 is a distributed system in which the functions described in this disclosure can be distributed within a data center, multiple data centers, a peer network, etc. In some embodiments, one or more of the described system components represents many such components, each performing some or all of the function for which the component is described. In some embodiments, the components can be physical or virtual devices.

Example system 700 includes at least one processing unit (CPU or processor) 710 and connection 705 that couples various system components, including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system containing multiple cores or processors, a bus, a memory controller, a cache, etc. A multi-core processor may be symmetric or asymmetric.

To enable user interaction, computing system 700 includes an input device 745, which can represent any number of peripheral input mechanisms, such as a microphone for speech, a touch-sensitive screen for gesture or graphical input, a keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that, when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special-purpose computer, or special-purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device by way of further example.

The instructions, media for conveying such instructions, computing resources for executing them, and other structures for supporting such computing resources are means for providing the functions described in these disclosures.

What is claimed is:

1. A method comprising:
    requesting, at a browser-based capture application on a first device, to initiate a first capture session, wherein the browser-based capture application captures a first audio, a first video, and at least a portion of a screen from the first device;
    receiving, at the browser-based capture application, a request to share the first capture session;
    receiving a link from a content management system, wherein the link creates a multi-user capture session allowing a second device to join the first capture session;
    receiving, at the browser-based capture application on the first device from the content management system, instructions configured to launch the multi-user capture session;
    receiving, at the browser-based capture application on the first device using the multi-user capture session, at least a second audio from the second device and a second video from the second device;
    capturing, at the browser-based capture application on the first device, the first audio, the first video, the at least a portion of the screen, the second audio, and the second video; and
    aggregating, by the browser-based capture application on the first device, the first audio, the first video, the at least a portion of the screen, and the second video into a single stream.

2. The method of claim 1, wherein the receiving at least the second audio from the second device and the second video from the second device further comprises:
    removing, by the browser-based capture application, the second audio.

3. The method of claim 1, further comprising:
    transmitting, to the second device, the single stream.

4. The method of claim 1, further comprising:
    storing a captured media object including the first audio, the first video, the at least a portion of the screen, the second audio, and the second video.

5. The method of claim 4, further comprising:
    segmenting the captured media object into a plurality of blocks; and
    uploading the plurality of blocks to the content management system while the browser-based capture application is capturing the first audio, the first video, the at least a portion of the screen, the second audio, and the second video.

6. The method of claim 1 further comprising:
    granting, by the browser-based capture application, to the second device, control of the multi-user capture session.

7. A non-transitory computer readable medium comprising instructions stored thereon, the instructions being effective to cause one or more processors of a capture service to:
    request, at a browser-based capture application on a first device, to initiate a first capture session, wherein the browser-based capture application captures a first audio, a first video, and at least a portion of a screen from the first device;
    receive, at the browser-based capture application, a request to share the first capture session;

receive a link from a content management system, wherein the link creates a multi-user capture session allowing a second device to join the first capture session;

receive, at the browser-based capture application on the first device from the content management system, instructions configured to launch the multi-user capture session;

receive, at the browser-based capture application on the first device using the multi-user capture session, at least a second audio from the second device and a second video from the second device within;

capture, at the browser-based capture application on the first device, the first audio, the first video, the at least a portion of the screen, the second audio, and the second video; and aggregate, by the browser-based capture application on the first device, the first audio, the first video, the at least a portion of the screen, and the second video into a single stream.

8. The non-transitory computer readable medium of claim 7, wherein the instructions to receive at least a second audio from the second device and a second video from the second device are further effective to cause the one or more processors of the capture service to:

remove, by the browser-based capture application, the second audio.

9. The non-transitory computer readable medium of claim 8, wherein the instructions are further effective to cause the one or more processors of the capture service to:

transmit, to the second device, the single stream.

10. The non-transitory computer readable medium of claim 7, wherein the instructions are further effective to cause the one or more processors of the capture service to:

store a captured media object including the first audio, the first video, the at least a portion of the screen, the second audio, and the second video.

11. The non-transitory computer readable medium of claim 10, wherein the instructions are further effective to cause the one or more processors of the capture service to:

segment the captured media object into a plurality of blocks; and upload the plurality of blocks to the content management system while the browser-based capture application is capturing the first audio, the first video, the at least a portion of the screen, the second audio, and the second video.

12. The non-transitory computer readable medium of claim 10, wherein the instructions are further effective to cause the one or more processors of the capture service to:

grant, by the browser-based capture application, to the second device, control of the multi-user capture session.

13. A system comprising:

at least one processor; and at least one storage including instructions stored thereon, the instructions are effective to cause the at least one processor to:

request, at a capture application on a first device, to initiate a first capture session, wherein the capture application captures a first audio, a first video, and at least a portion of a screen from the first device;

receive, at the capture application, a request to share the first capture session;

receive, a link from a content management system, wherein the link creates a shared capture session allowing a second device to join the first capture session;

receive, at the capture application on the first device using the shared capture session, at least a second audio and a second video from the second device;

capture, at the capture application on the first device, the first audio, the first video, the at least a portion of the screen, the second audio, and the second video; and aggregate, by the capture application on the first device, the first audio, the first video, the at least a portion of the screen, and the second video into a single stream.

14. The system of claim 13, wherein the instructions for receiving at least a second audio from the second device and a second video from the second device comprise further instructions effective to cause the at least one processor to:

remove, by the capture application, the second audio.

15. The system of claim 13, wherein the instructions are further effective to cause the at least one processor to:

transmit, to the second device, the single stream.

16. The system of claim 13, wherein the instructions are further effective to cause the at least one processor to:

store a captured media object including the first audio, the first video, the at least a portion of the screen, the second audio, and the second video.

17. The system of claim 16, wherein the instructions are further effective to cause the at least one processor to:

segment the captured media object into a plurality of blocks; and upload the plurality of blocks to the content management system while the capture application is capturing the first audio, the first video, the at least a portion of the screen, the second audio, and the second video.

18. The system of claim 13, comprising further instructions to:

grant, by the capture application, to the second device, control of the shared capture session.

* * * * *